United States Patent [19]

Ohba

[11] Patent Number: 5,649,394

[45] Date of Patent: Jul. 22, 1997

[54] APPARATUS FOR INHIBITIVELY PREVENTING BIRDS FROM CROWDING

[75] Inventor: Tadao Ohba, Saitama-Ken, Japan

[73] Assignee: Ohba Building Maintenance Co., Ltd., Japan

[21] Appl. No.: 263,132

[22] Filed: Jun. 21, 1994

[30] Foreign Application Priority Data

| Nov. 5, 1993 | [JP] | Japan | 5-064234 U |
| Nov. 13, 1993 | [JP] | Japan | 5-065430 U |
| Dec. 17, 1993 | [JP] | Japan | 5-072791 U |

[51] Int. Cl.⁶ .................... E04B 1/72; A01M 29/00
[52] U.S. Cl. .................... 52/101; 52/DIG. 4; 116/22 A; 43/124
[58] Field of Search .................... 52/101, DIG. 4; 116/22 A, 173; 43/124, 1; 343/882, 805, 888, 715, DIG. 1; 256/10, 11, 12

[56] References Cited

U.S. PATENT DOCUMENTS

| 3,008,140 | 11/1961 | Rose | 343/882 X |
| 3,292,319 | 12/1966 | McCarthy | 52/101 |
| 5,252,444 | 10/1993 | Donoho et al. | 43/1 |
| 5,353,543 | 10/1994 | Teraoka | 52/101 X |
| 5,389,942 | 2/1995 | Oglesby, Jr. | 343/888 X |

FOREIGN PATENT DOCUMENTS

| 2267037 | 11/1975 | France | 52/101 |
| 4300154 | 7/1994 | Germany | 52/101 |
| 1418455 | 8/1988 | Russian Federation | 52/101 |
| 2194566 | 3/1988 | United Kingdom | 52/101 |
| 2221232 | 1/1990 | United Kingdom | 116/22 A |

*Primary Examiner*—Carl D. Friedman
*Assistant Examiner*—Winnie Yip
*Attorney, Agent, or Firm*—Andrus, Sceales, Starke & Sawall

[57] ABSTRACT

Birds, especially, pigeons dislike the presence of a magnetic field because each bird has a biological instinctive ability of sensing the presence of the magnetic field. In order to utilize this biological instinctive sensing ability for the purpose of preventing birds from crowding at the upper part of a building, a plurality of magnetic members are disposed on an arm(s) turnably held at the uppermost end of a support column. When a bird perches on the arm, the latter is turned by the action of his own dead weight, resulting in the bird amazingly flying away from the arm. It is effective that a rotary wind blade having two magnetic members immovably secured to the opposite sides thereof is disposed at the uppermost end of each support column so as to largely affect the magnetic field induced by the magnetic members disposed on the arm and the magnetic members disposed on the rotary wind blade. Magnetic members may be disposed on a wire-shaped member tightly spanned between adjacent support columns, a bird threatening unit, a plurality of wires suspending from the upper end of an opening portion located above the veranda of a building or a similar member.

6 Claims, 26 Drawing Sheets

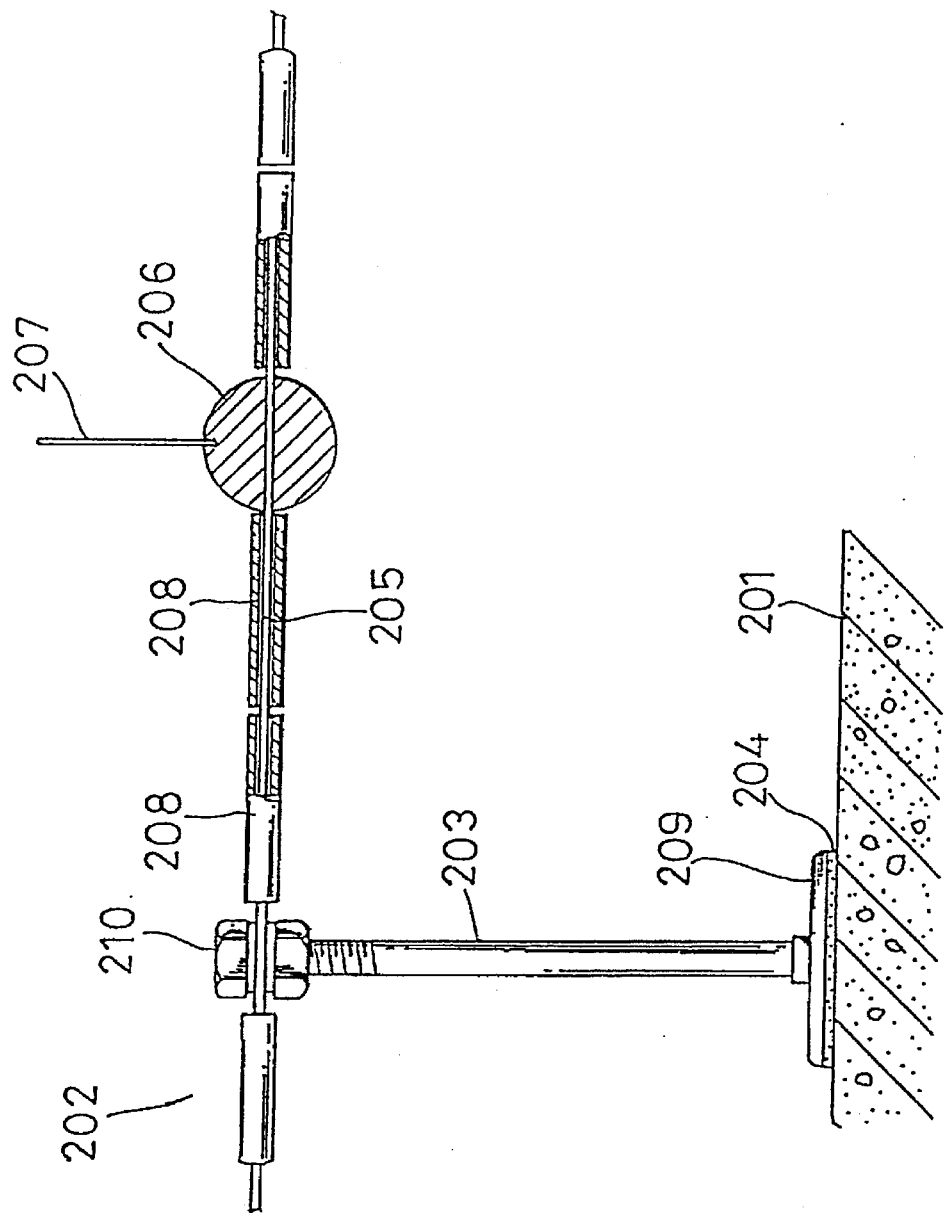

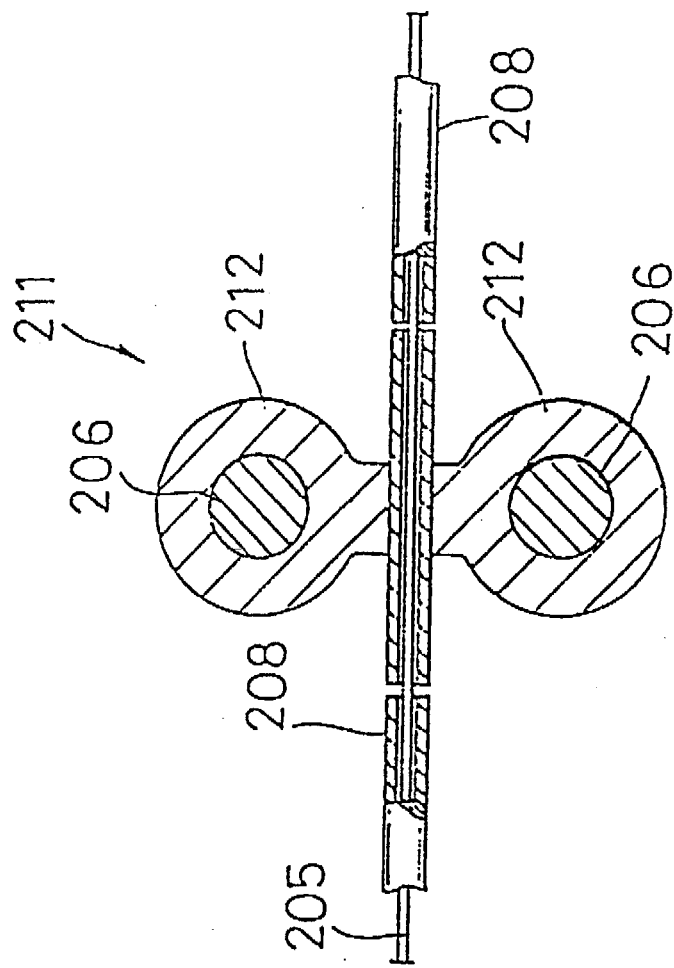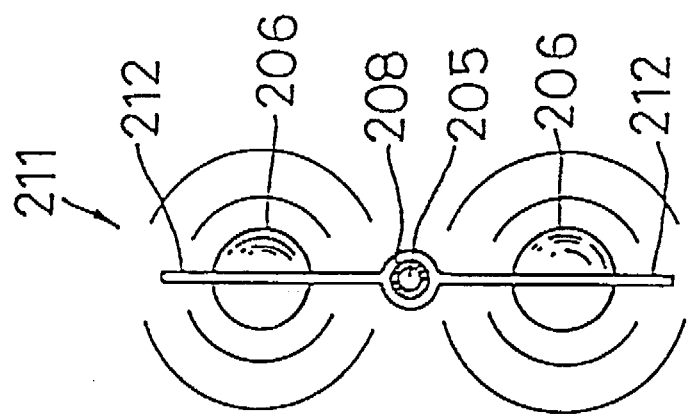

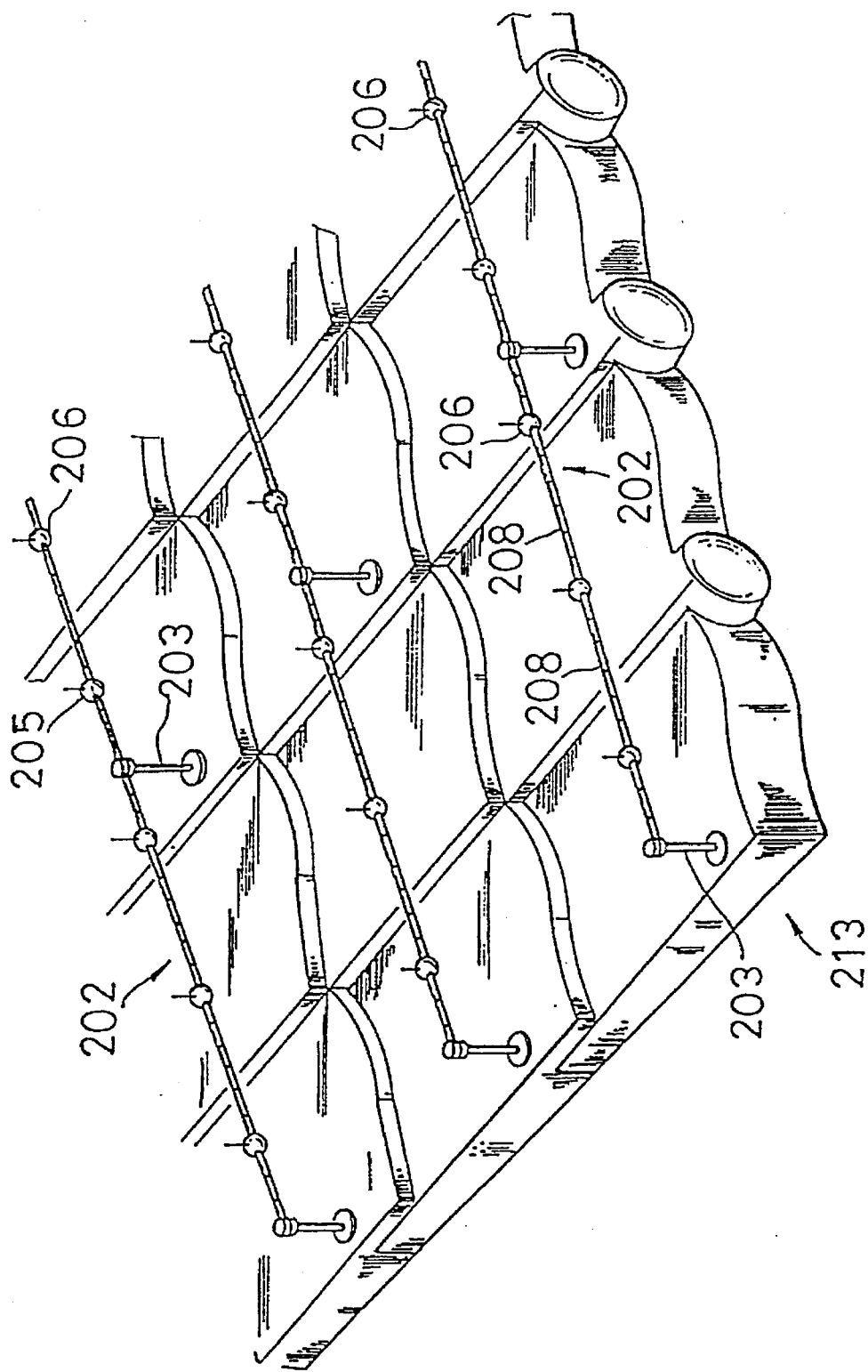

5,649,394

APPARATUS FOR INHIBITIVELY PREVENTING BIRDS FROM CROWDING

BACKGROUND OF THE INVENTION

1. Field of the Invention

The present invention relates generally to an apparatus for inhibitively preventing birds such as pigeons or the like from crowding at the upper part of a building such as a veranda or the like. More particularly, the present invention relates to improvement of an apparatus of the foregoing type.

2. Description of the Related Art

In recent years, the number of birds such as pigeons, crows, sparrows, gray starlings or the like living in a city increases but droppings and infectious bacilli discharged from birds become a serious problem from the viewpoint of environmental sanitary. In view of the foregoing fact, various proposals have been made with respect to an apparatus for inhibitively preventing birds such as pigeons or the like from crowding inside of a veranda or a similar location on a building by utilizing, e.g., needles, supersonic sound, rapacious bird eye-like convexly marks or the like. In addition, another proposals have been made with respect to an apparatus of the foregoing type in significant consideration of the fact that each bird dislikes the presence of a high intensity of magnetic field because the biological instinctive ability of each bird for sensing the magnetic field (effective for determining the direction of his flying or maintaining an instinct of returning to his home position by himself) is adversely disturbed by the magnetic field. In this connection, it is recommendable that reference is made to an official gazette of, e.g., Japanese Utilization Model Publication NO. 4-10789 which discloses a typical apparatus of the aforementioned type.

However, this conventional apparatus has the following problem. Specifically, a plurality of semispherical magnets arranged along a tension wire in the substantially equally spaced relationship as seen in the horizontal direction exhibit a function of preventing pigeons from crowding on the tension wire to some extent but some pigeons are not sensitive to the magnetic field, causing them to perch still on the tension wire between adjacent magnets. For this reason, the foregoing proposed apparatus is not satisfactorily acceptable for any user.

In addition, a proposal has been made by an applicant common to the present invention with respect to an apparatus for inhibitively preventing birds from crowing at the upper part of a building wherein the apparatus is constructed such that a pair of support columns are caused to stand upright from the handrail of a veranda, a wire is tightly spanned between both the support columns, and a plurality of magnetic members are arranged along the wire in the spaced relationship for the purpose of preventing birds from perching on the veranda (see the specification of Japanese Utilization Model Application NO. 4-93897).

It is certain that this proposed apparatus is effective for preventing pigeons from perching on the handrail of the veranda. However, in the case that the veranda has a large width, it is necessary that many apparatuses each constructed in that way are mounted on the veranda. When birds invade directly in a room through a window, the proposed apparatus not always exhibits its own function.

To cope with the foregoing problem, it is thinkable that all the opening portions on a building are covered with a net or a similar material. However, at the time of an occurrence of emergency such as firing or the like, the net becomes a kind of obstacle not only for persons who want to escape from their room but also for firemen who should enter the room for performing a fire fighting operation.

SUMMARY OF THE INVENTION

The present invention has been made in consideration of the aforementioned background.

An object of the present invention is to provide an apparatus for inhibitively preventing birds such as pigeons or the like from crowding at the upper part of a building such as a veranda or the like wherein the apparatus assures that crowding of birds, especially, pigeons on the rooftop of a building or a similar location can reliably be prevented.

Other object of the present invention is to provide an apparatus for inhibitively preventing birds such as pigeons or the like from crowding at the upper part of a building such as a veranda or the like wherein the apparatus can reliably prevent invasion of the birds inside of the veranda or the like, and moreover, it does not become a kind of obstacle for achieving a fire fighting operation to be performed by firemen at the time of an occurrence of firing by dismounting or removing the apparatus from the veranda or the like.

Another object of the present invention is to provide an apparatus for inhibitively preventing birds such as pigeons or the like from crowding at the upper part of a building such as a veranda or the like wherein the apparatus assures that excellent bird dispersing properties can be exhibited by effectively utilizing the magnetic field generated by a plurality of magnetic members, the apparatus has long durability, and moreover, the apparatus has a high degree of safety for other kinds of animals rather than the birds.

Further object of the present invention is to provide an apparatus for inhibitively preventing birds, especially, pigions, crows, sparrows, gray starlings or swallows from crowing at the upper part of a building wherein the apparatus assures that the veranda, the handrail or the rooftop of a living house, the rooftop of a cathedral, a shrine, a broad casting station's tower or a power-transmission line's tower is not unpleasantly contaminated with their droppings.

Further another object of the present invention is to provide an apparatus for inhibitively preventing birds, especially, sea-gulls or similar birds from crowding together wherein the apparatus assures that the sail or the mast of a yacht, the upper surface of each floating buoy or the handrail of a bridge is not unpleasantly contaminated with their droppings.

Still further another object of the present invention is to provide an apparatus for inhibitively preventing birds, especially, owls or similar birds from crowding together in the vicinity of a living house wherein the apparatus assures that a person(s) staying in the living house are not unpleasantly disturbed with their crying voice or noisy sound induced by the fluttering of their wings.

According to a first aspect of the present invention, there is provided an apparatus for inhibitively preventing birds from crowding at the upper part of a building, wherein the apparatus comprises a support column standing upright from the upper part of the building; an arm turnably disposed at the uppermost end of the support column to turn about an intersection where the support column intersects the arm normally at a right angle relative to each other in the upward/downward direction and/or in the leftward/rightward direction, the intersection being positionally coincident with the uppermost end of the support column; and two magnetic members disposed at the opposite ends of the arm.

To enhance the bird dispersing effect of the apparatus, it is acceptable that two or more arms are arranged one above another to build a two-staged structure, a three-staged structure or the like.

Alternatively, for the same purpose as mentioned above, two or more arms are arranged in the equally spaced relationship as seen in the circumferential direction while defining a certain angle between adjacent arms, and two magnetic members are immovably disposed at the opposite ends of each of the arms.

Otherwise, for the same purpose as mentioned above, each of the support column and/or the arm(s) may be prepared in the form of a coil spring.

Usually, each arm is made of a metallic material. In some case, each arm may be made of a non-metallic material such as wood, synthetic resin, rubber, fibrous material or the like depending on the position where the apparatus is practically used, e.g., the position located on the uppermost part of a tower for a power-transmission line system.

In addition, according to a second aspect of the present invention, there is provided an apparatus for inhibitively preventing birds from crowding at the upper part of a building, wherein the apparatus comprises a plurality of support columns each standing upright from the upper part of the building, the support columns being arranged in the spaced relationship along the upper part of the building; a wire-shaped member tightly spanned between two support columns located at the opposite ends of the wire-shaped member as seen in the horizontal direction; a plurality of cylindrical hollow magnetic members each having the wire-shaped member inserted therethrough in the horizontal direction; and a plurality of sleeves each having the wire-shaped member inserted therethrough in the horizontal direction and located adjacent to each cylindrical hollow magnetic member in such a manner as to allow the cylindrical hollow magnetic members and the sleeves to be alternately arranged along the wire-shaped member.

To assure that the position to be assumed by the cylindrical hollow magnetic members is definitely determined, it is desirable that two washers are disposed at the opposite ends of each cylindrical hollow magnetic members while the wire-shaped member is inserted through the washers.

To enhance the bird dispersing effect of the apparatus, it is desirable that a rotary wind blade is disposed at the uppermost end of each support column in such a manner that the rotary wind blade is rotated as wind stream collides against the rotary wind blade, and two magnetic members are immovably fitted to the rotary wind blade on the opposite sides of the latter.

Additionally, according to a third aspect of the present invention, there is provided an apparatus for inhibitively preventing birds from crowding at the upper part of a building, wherein the apparatus comprises a plurality of support columns each standing upright from the upper part of the building, the support columns being arranged in the spaced relationship along the upper part of the building; a wire-shaped member tightly spanned between two support columns located at the opposite ends of the wire-shaped member as seen in the horizontal direction; a plurality of magnetic members each having the wire-shaped member inserted therethrough in the horizontal direction, the magnetic members being arranged along the wire-shaped member between adjacent support columns in the spaced relationship; and a plurality of spacer tubes each made of a non-metallic material and located between adjacent magnetic members or between one support column and one magnetic member, the spacer tube having the wire-shaped member inserted therethrough in such a manner as to allow the spacer tubes to be rotated about the wire-shaped member.

It is preferable that each of the magnetic members is contoured in the form of a balloon.

Similarly, to enhance the bird dispersing effect of the apparatus, it is effectively acceptable that a magnetic needle is fitted to the balloon-shaped magnetic member while standing upright from the latter.

Alternatively, a plurality of magnetic needles may be fitted to the balloon-shaped magnetic member while projecting outside of the latter.

For the same purpose as mentioned above, it is preferable that a rotary wind blade is fitted onto the spacer tube in such a manner that the rotary wind blade is rotated about the spacer tube as wind stream collides against the rotary wind blade, and two magnetic members are immovably fitted to the rotary wing blade on the opposite side of the latter.

Further, according to a fourth aspect of the present invention, there is provided an apparatus for inhibitively preventing birds from crowding at the upper part of a building, wherein the apparatus comprises a first base member secured to the upper end of an opening portion located above the upper part of the building, the first base member extending along the upper end of the opening portion in the horizontal direction; a plurality of wires suspended from the first base member in the equally spaced relationship as seen in the horizontal direction; a second base member detachably secured to the plurality of wires at the lower end parts of the latter to serve also as a weight for the apparatus, the second base member extending in parallel with the first base member in the horizontal direction; a plurality of magnetic members disposed at the lower end parts of the wires above the second base member in the spaced relationship as seen in the horizontal direction; and a wire connecting/disconnecting mechanism for connecting one of the wires or all of the latter to the second base member and disconnecting the former from the latter.

The wire connecting/disconnecting is composed of a split type chuck disposed in the second base member so as to allow a wire to be inserted therethrough, a coil spring disposed below the chuck to normally bias the latter in the upward direction so as to hold the chuck from below to assume a connected state, and a depressing pin inserted through a hole formed in the second base member for splitting the chuck into two halves so as to release the wire from the connected state.

It is preferable that a depressing plate is arranged above the second base member in order to simultaneously release some or the wires or all of the wires from the connected state by actuating the wire connecting/ disconnecting mechanism.

Moreover, according to a fifth aspect of the present invention, there is provided an apparatus for inhibitively preventing birds from crowding at the upper part of an opening portion located at the upper end of the building, the first base member extending along the upper end of the opening portion in the horizontal direction; a plurality of wires suspended from the first base member in the equally spaced relationship as seen in the horizontal direction; a second base plate detachably secured to the plurality of wires at the lower end parts of the latter to serve also as a weight for the apparatus, the second base member extending in parallel with the first base member in the horizontal direction; a plurality of magnetic members disposed at the lower end part of the wires above the second base member in the spaced relationship as seen in the horizontal direction;

and a curtain mechanism arranged below the first base member to displace some of the wires or all of the same together in the horizontal direction so as to form a wide hollow space between the first base member and the second base member in order that persons living in a room can quickly escape from the latter through the wide hollow space or firemen can easily enter the room through the same at the time of an occurrence of emergency such as firing or the like.

Usually, the curtain mechanism is composed of a casing, a rail received in the casing, and a plurality of hooks displaceably held by the rail for suspending the wires therefrom in such a manner as to allow the wires to be slidably displaced in the horizontal direction with the aid of the rail.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which:

FIG. 19 is a fragmentary front view of the apparatus shown in FIG. 18 wherein the apparatus is partially exploded;

FIG. 20(A) and FIG. 20(B) illustrate an apparatus for inhibitively preventing birds, especially, pigeons from crowding at the upper part of a building, respectively, wherein the apparatus is constructed in accordance with an eleventh embodiment of the present invention;

FIG. 21 is a perspective view which illustrates the operative state that a plurality of apparatuses each constructed as shown in FIG. 18 and FIG. 19 are arranged on the rooftop of a Japanese type living house;

DESCRIPTION OF THE PREFERRED EMBODIMENTS

The present invention will now be described in detail hereinafter with reference to the accompanying drawings which illustrate preferred embodiments thereof.

Figure 1:
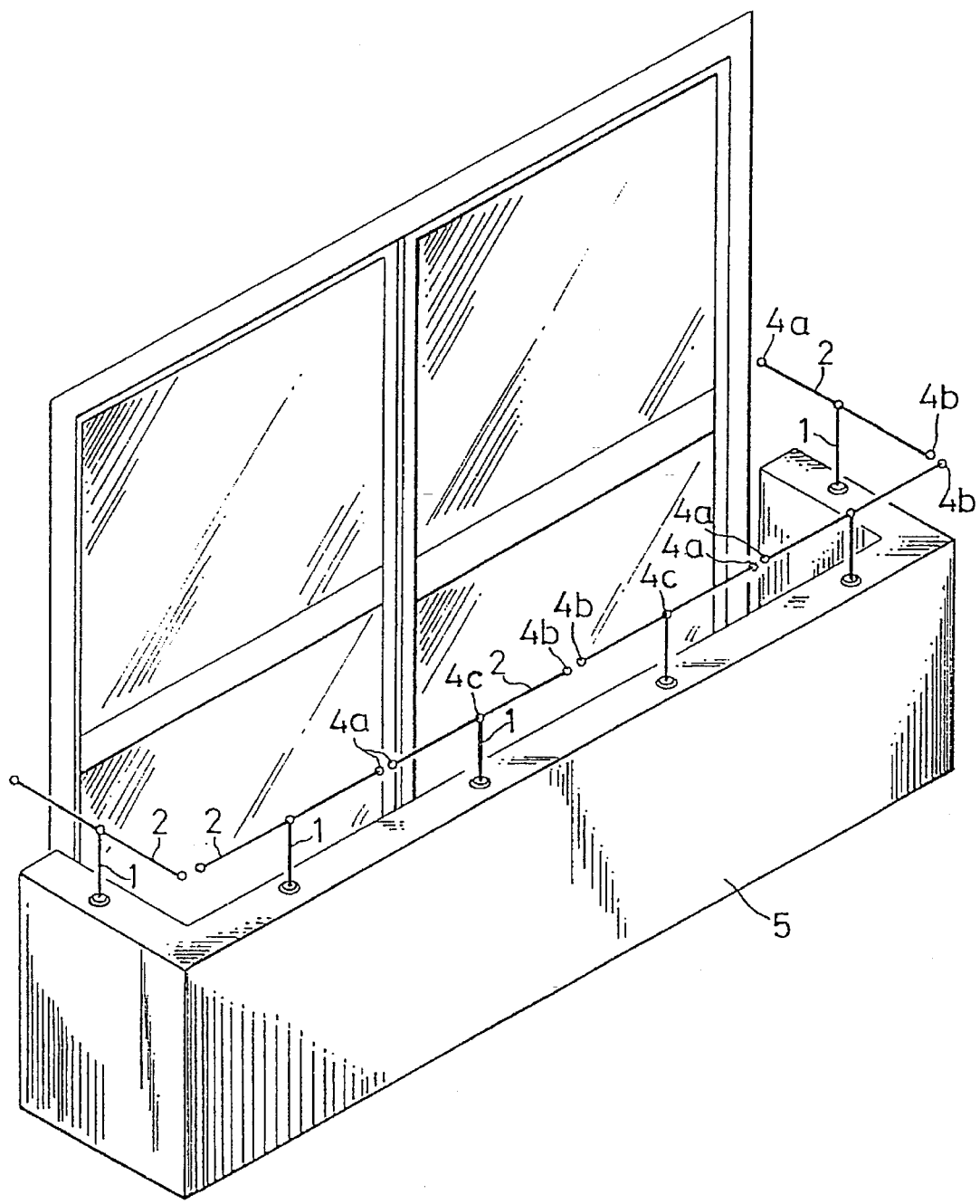
FIG. 1 is a perspective view of a plurality of apparatuses each serving for inhibitively prevent birds, especially, pigeons from crowding at the upper part of a building wherein each apparatus is constructed in accordance with a first embodiment of the present invention.
Figure 2:
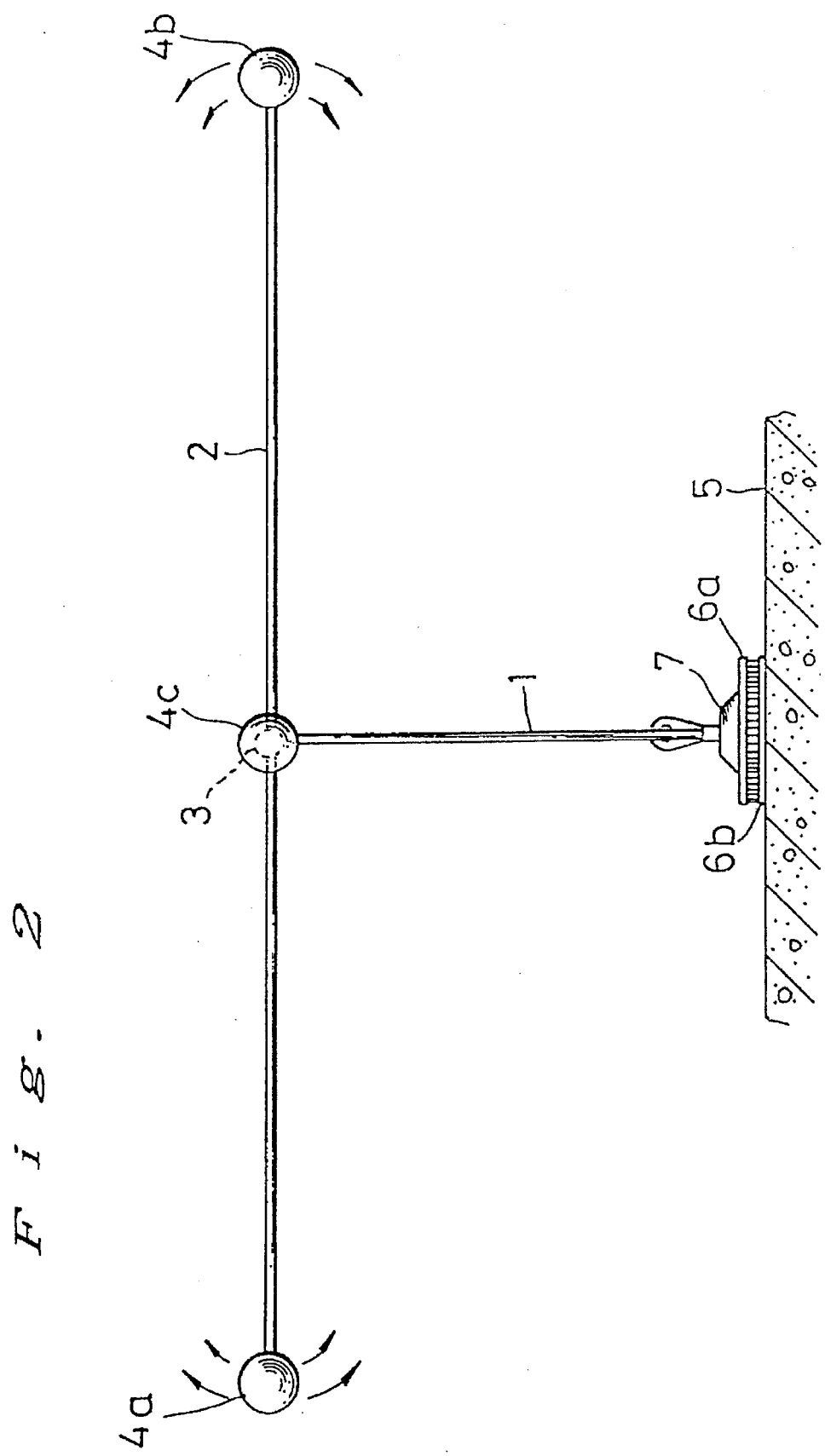
FIG. 2 is a front view of one of the apparatuses shown in FIG. 1.

First, an apparatus for inhibitively preventing birds, especially, pigeons from crowding at the upper part of a building (hereinafter referred to simply as an apparatus) constructed in accordance with a first embodiment of the present invention will be described below with reference to FIG. 1 and FIG. 2 wherein FIG. 1 is a perspective view of a plurality of apparatuses as arranged in the end-to-end relationship on the veranda of a building and FIG. 2 is a front view of the apparatus shown in FIG. 1.

In the drawings, reference numeral 1 designates a support column which is prepared in the form of a bolt, a round rod material, a rod-shaped material having a square cross-sectional contour, a plate-shaped material or the like, and reference numeral 2 designates an arm which is turnably disposed at the uppermost end of the support column 1 with a horizontal attitude. The arm 2 is turnably supported to turn about an intersection 3 where the support column 1 intersects the arm 2 at the substantially central part of the latter at a right angle relative to each other. With this construction, when a bird perches on the arm 2 while seizing the latter with his feet or he flutters his wings on the arm 2 or a wind stream collides against the arm 2, the latter is caused to turn in the upward/downward direction and/or in the leftward/rightward direction.

Reference numerals 4a and 4b designate magnetic members which are disposed at the opposite ends of the arm 2, respectively. As desired, another magnetic member 4c is disposed at the intersection 3, i.e., a support point for the arm 2. It should be noted that a length of the arm 2 and a weight of each of the magnetic members 4a and 4b are determined to maintain a well-balanced state among the magnetic members 4a, 4b and 4c.

Figure 3:
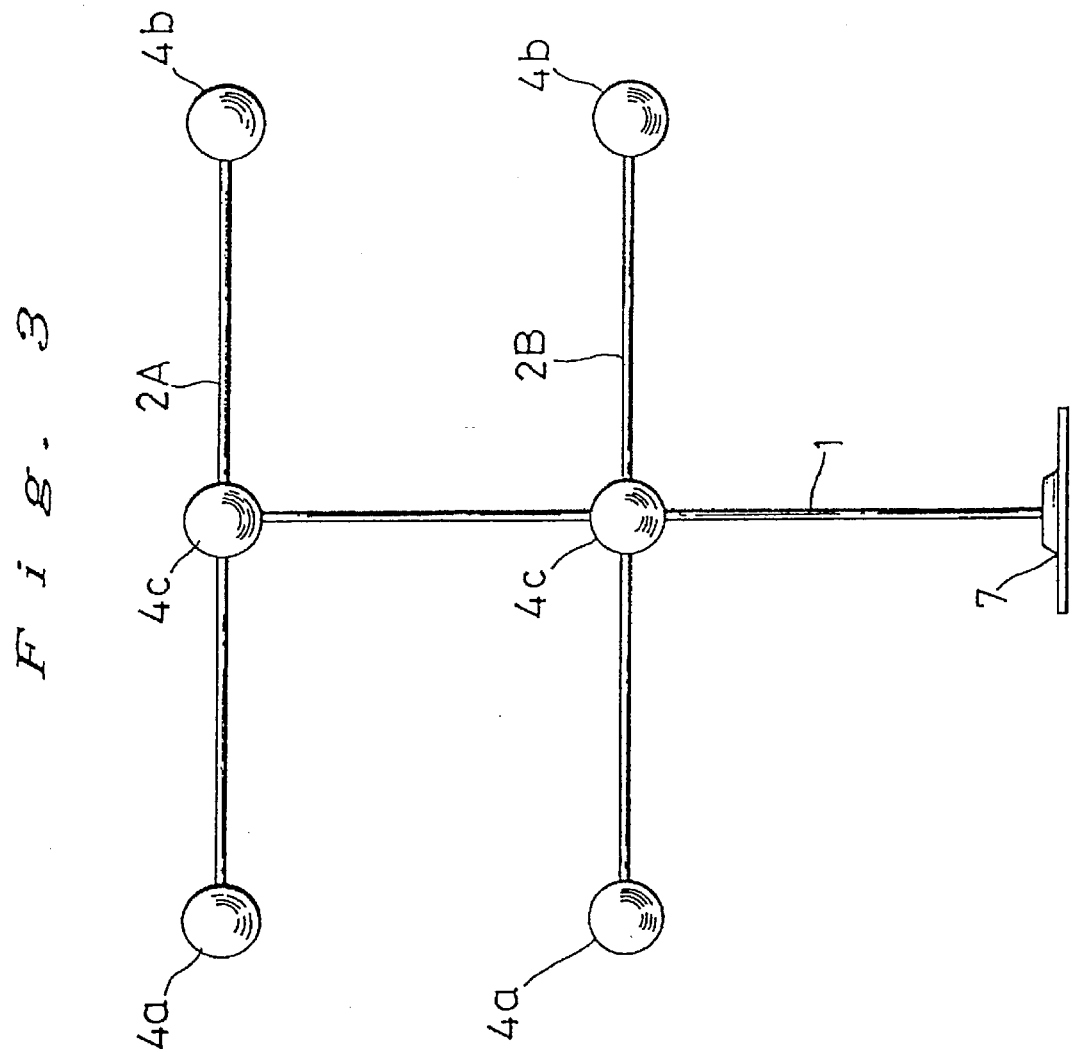
FIG. 3 is a front view of an apparatus for inhibitively preventing birds, especially, pigeons from crowding at the upper part of a building wherein the apparatus is constructed in accordance with a second embodiment of the present invention.

The support column 1 is firmly mounted at a location where it is unacceptable that a bird perches on the arm 2 while seizing the latter with his feet and he often drops his excrement, by using an adhesive or tightening bolts and nuts. The foregoing unacceptable location is exemplified by a handrail 5 on the veranda of a living mansion, a rooftop of a Japanese living house or a cathedral, a rooftop of a building, a lighting device mounted on each tree planted along a city road and a mercury lamp mounted on a mast of a small-sized ship. In the shown case, a hitherto known handy attaching/ detaching unit represented by reference numerals 6a and 6b is employed for the support column 1. It is recommendable that a height of the support column 1 is adequately changed depending on the kind of birds. For example, in the case of pigeons, it is preferable that the height of the support column 1 is set to about 10 cm, and in the case of crows, it is set to about 20 cm. In addition, in the case of comparatively large birds such as crows or the like, it is desirable that the apparatus includes two arms arranged at two stages, i.e., an upper arm 2A and a lower arm 2B as shown in FIG. 3 which illustrates a second embodiment of the present invention.

Additionally, a length of the arm 2 is changed depending on the number of magnetic members to be attached to the arm 2. In the case that three magnetic members 4a, 4b and 4c are attached to the arm 2 at three locations, i.e., the opposite ends and the central part of the arm 2 as shown in FIG. 2, the length of the arm 2 is set to about 30 to 40 cm.

It should be noted that it is acceptable that an intensity of magnetic force employable for the apparatus is determined such that each bird senses the presence of a magnetic field, causing the bird head's biological instinctive ability of sensing the magnetic field to be affected to a certain extent. It is found based on the results derived from a variety of experiments that the intensity of magnetic force is preferably set to 1000 gausses or more.

When the apparatus is mounted at the upper part of a building, first, dust particles, oily materials, bird's droppings or similar foreign materials deposited at a predetermined mounting position (e.g., located on a handrail 5 on the veranda of a building) are completely removed therefrom by brushing, water washing or the like. At this time, one half 6b of the conventional handy attaching/detaching unit is preliminarily fixed to the handrail 5, and subsequently, other half 6a of the same is removably secured to a base 7 of the support column 1. With this construction, e.g., when a set of beddings are placed on the veranda in the suspended state for exposing them to sunshine for the purpose of drying them, the attaching/detaching unit has an advantage that it can easily be disassembled at the foregoing position. In practice, it is preferable that a plurality of apparatuses are arranged along a single line on the veranda in the end-to-end relationship without any gap between adjacent apparatuses. In this case, when two apparatuses are arranged on the veranda such that adjacent magnetic members 4a and 4b on both the apparatuses exhibit a same magnetic polarity (e.g., a north magnetic polarity or a south magnetic polarity), causing them to be turnably parted away from each other by the action of the magnetic repulsive force appearing therebetween.

With this construction, since birds, especially, pigeons instinctively dislike the presence of the magnetic field, there hardly arises an occasion that they come near to the magnetic members 4a to 4c. In the case that some bird remains insensitive to the magnetic field perches on the arm 2 while seizing the latter with his feet, the arm 2 is caused to turn about the intersection 3 by the action of his own dead weight, resulting in the bird amazingly flying away from the apparatus. In addition, when the arm 2 turns about the intersection 3, causing the magnetic members 4a and 4b to be displaced away from their original positions, the magnetic field is largely disturbed, whereby the magnetic fields generated by adjacent apparatuses substantially interfere with each other. Consequently, birds dislike to come near to these apparatuses much more than the preceding case.

Usually, the arm 2 is made of a metallic material. Alternatively, the arm 2 may be made of a non-metallic material such as wood, synthetic resin, rubber, fibrous fiber or the like. When the arm 2 is made of a certain non-metallic material, the apparatus can be used on or peripheral to a tower for a power-transmission line system.

Figure 4:
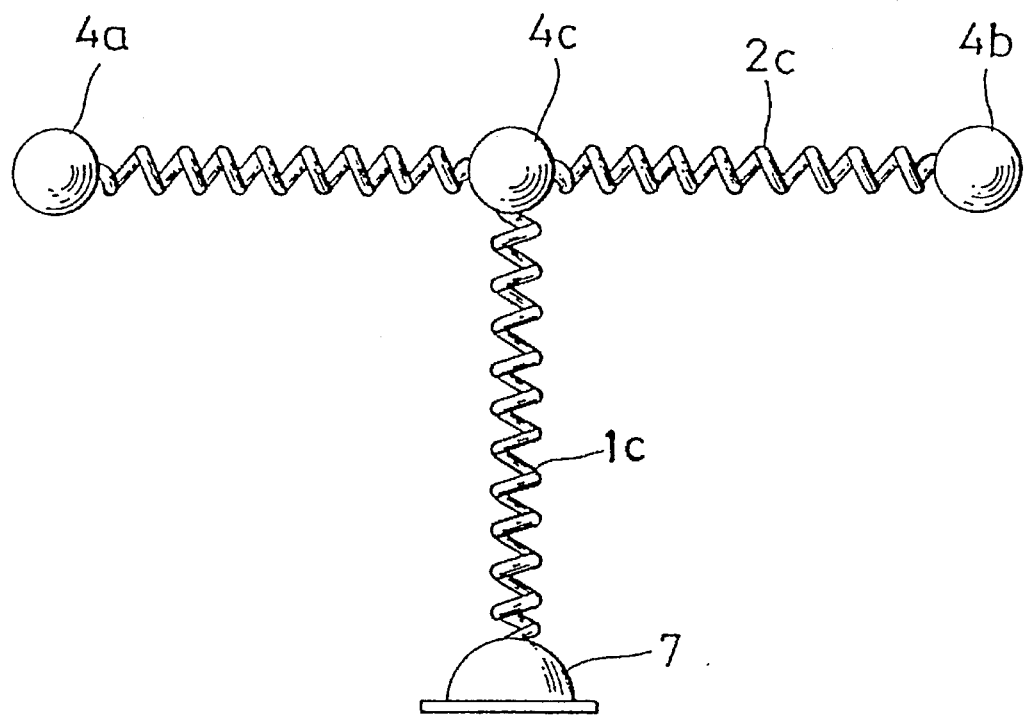
FIG. 4 is a front view of an apparatus for inhibitively preventing birds, especially, pigeons from crowding at the upper part of a building wherein the apparatus is constructed in accordance with a third embodiment of the present invention.

FIG. 4 shows by way of front view the structure of an apparatus constructed in accordance with a third embodiment of the present invention. In this embodiment, a support column and/or an arm are made of an elastic or resilient material which is prepared in the form of coil springs 1c and 2c. Since the support column and/or the arm are caused to largely turn about an intersection positionally coincident with the magnetic member 4c when the coil springs are employed for the support column and/or the arm, an aforementioned advantageous effect of the apparatus of allowing birds to dislike or hesitate to come near thereto can be enhanced.

Figure 5:
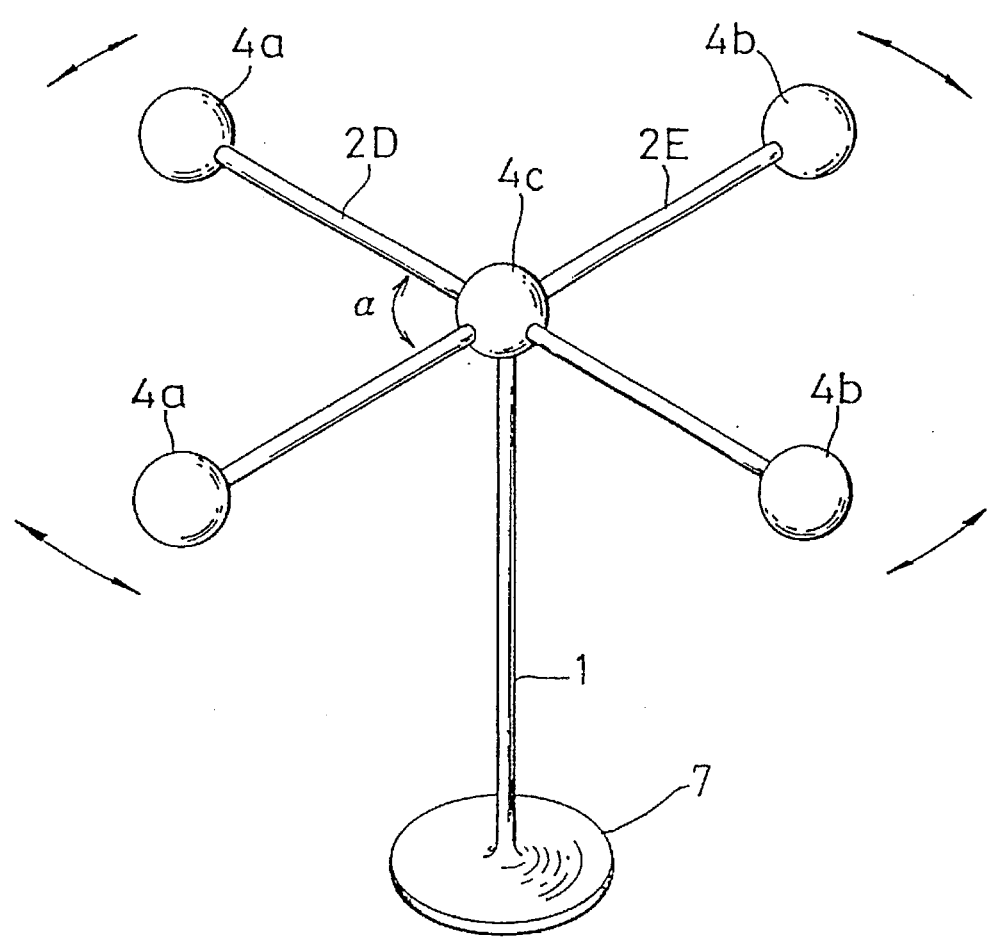
FIG. 5 is a perspective view of an apparatus for inhibitively preventing birds, especially, pigeons from crowding at the upper part of a building wherein the apparatus is constructed in accordance with a fourth embodiment of the present invention.
Figure 6:
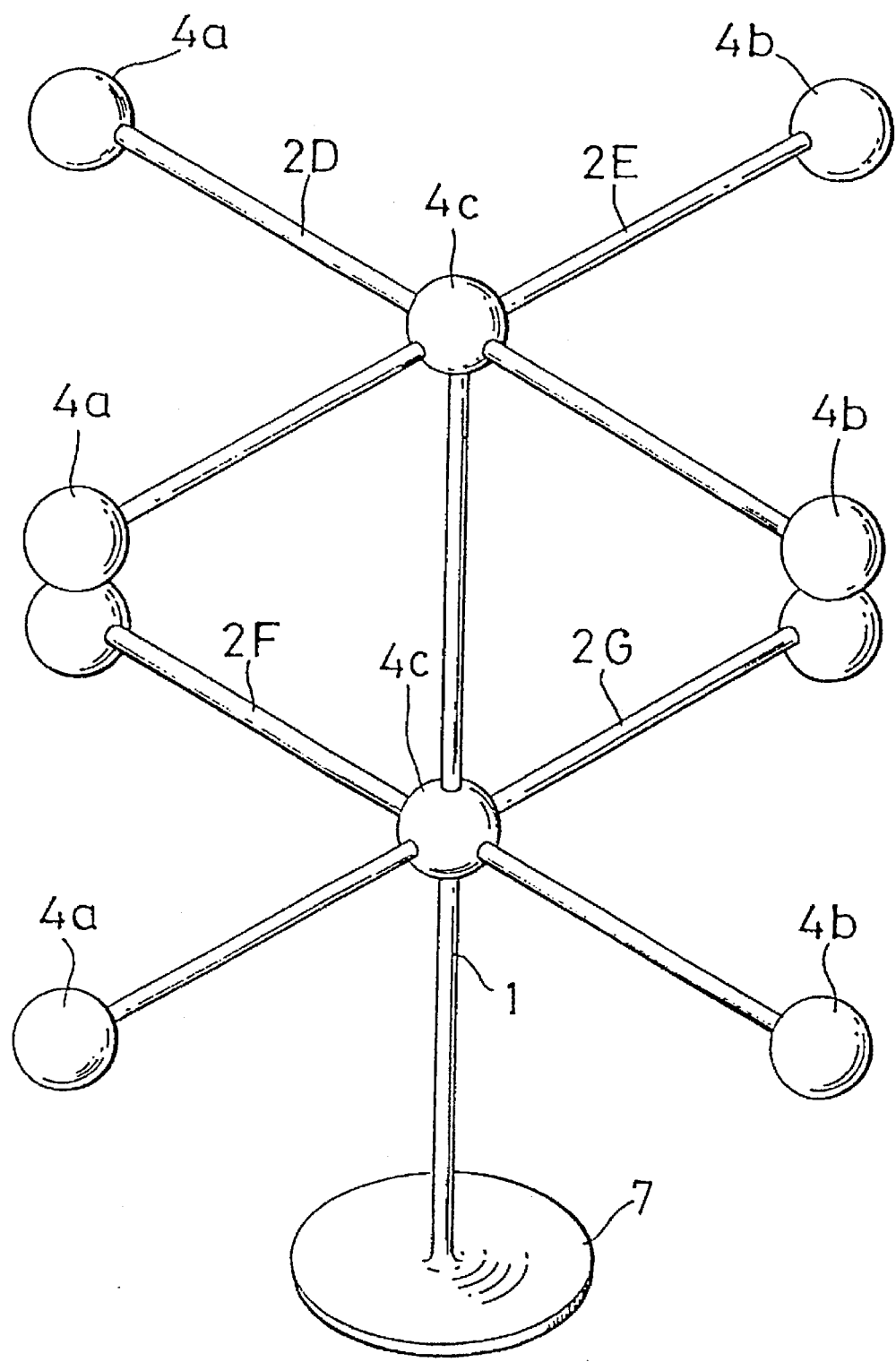
FIG. 6 is a perspective view of an apparatus for inhibitively preventing birds, especially, from crowding at the upper part of a building wherein the apparatus is constructed in accordance with a fifth embodiment of the present invention.

FIG. 5 shows by way of perspective view the structure of an apparatus constructed in accordance with a fourth embodiment of the present invention. In this embodiment, two arms 2D and 2E are turnably supported on a support column 1 while defining an angle a between both the arms 2D and 2E. Similar to the second embodiment shown in FIG. 2, arms 2D to 2F may be arranged to exhibit a staged structure as shown in FIG. 6 which illustrates a sixth embodiment of the present invention. It of course is obvious that the support column 1 and the arms 2D to 2F may be made of an elastic or resilient material which is worked in the form of a coil spring.

Figure 7:
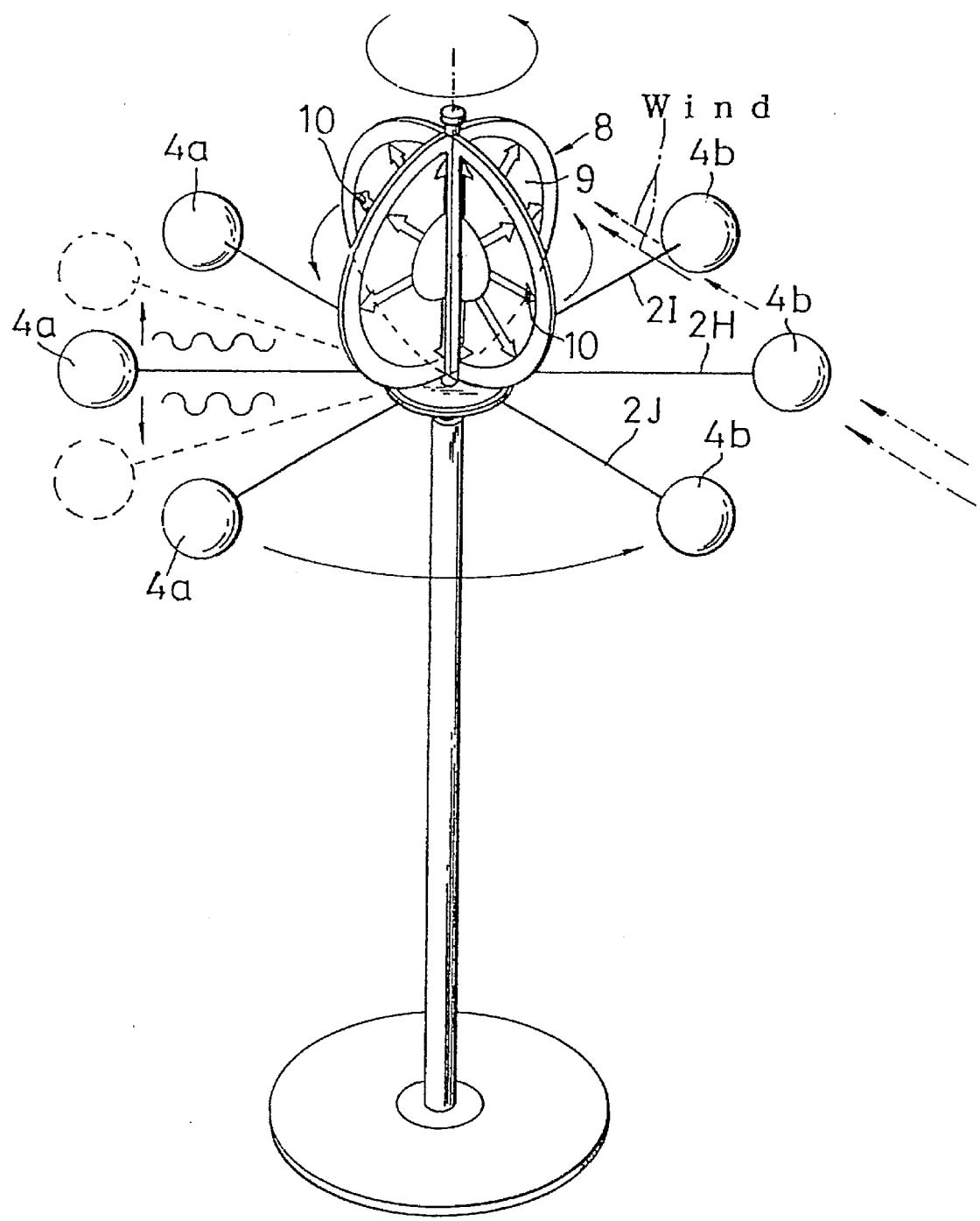
FIG. 7 is a perspective view of an apparatus for inhibitively preventing birds, especially, pigeons from crowding at the upper part of a building wherein the apparatus is constructed in accordance with a sixth embodiment of the present invention.
Figure 8:
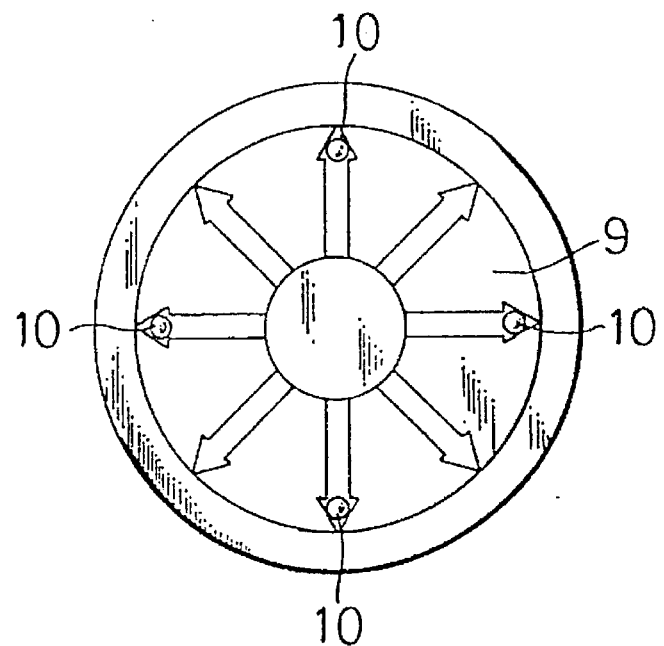
FIG. 8 is a front view of a rotary type bird threatening unit employed for the apparatus shown in FIG. 7.

FIG. 7 and FIG. 8 illustrate an apparatus constructed in accordance with a sixth embodiment of the present invention, respectively. In this embodiment, a rotary bird threatening unit 8 is disposed at the uppermost end of a support column including a plurality of rotatable arms 2H to 2J while a plurality of rapacious bird eye-like marks 9 are formed on the bird threatening unit 8 as bird threatening means, and a plurality of magnetic members 10 are arranged at predetermined positions on the bird threatening unit 8. Since the rapacious bird eye-like marks 9 are effective for threatening birds in addition to the magnetic field generated by the magnetic members 10, and moreover, the bird threatening unit 8 is able to rotate about the center line of the support column 1, the bird dispersing effect obtainable from the apparatus can substantially be enhanced.

Figure 9:
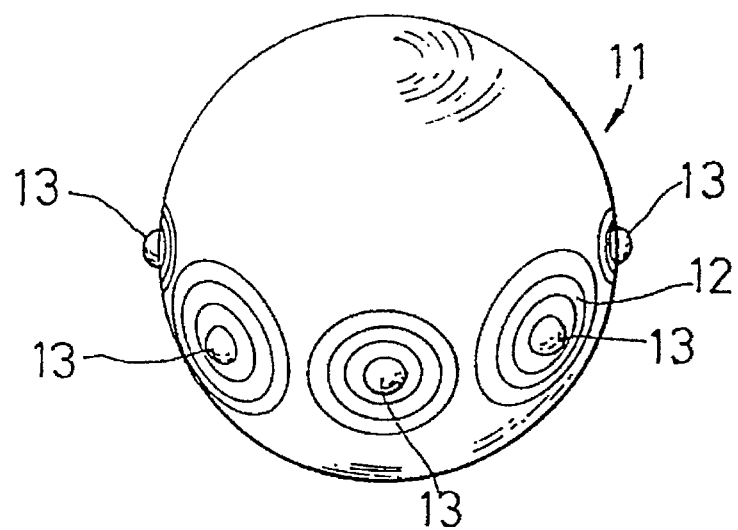
FIG. 9 is a front view of another rotary type bird threatening unit employed for the apparatus shown in FIG. 7.

In addition, the bird threatening unit 8 should not be limited only to the cross-shaped contour as shown in FIG. 7 and FIG. 8. Alternatively a spherical balloon-shaped bird threatening unit 11 having a plurality of rapacious bird eye-like convex marks 12 each including a magnetic member 13 arranged in the circumferential direction thereof as shown in FIG. 9 may be substituted for the bird threatening unit 8 shown in FIG. 7 and FIG. 8.

Figure 10:
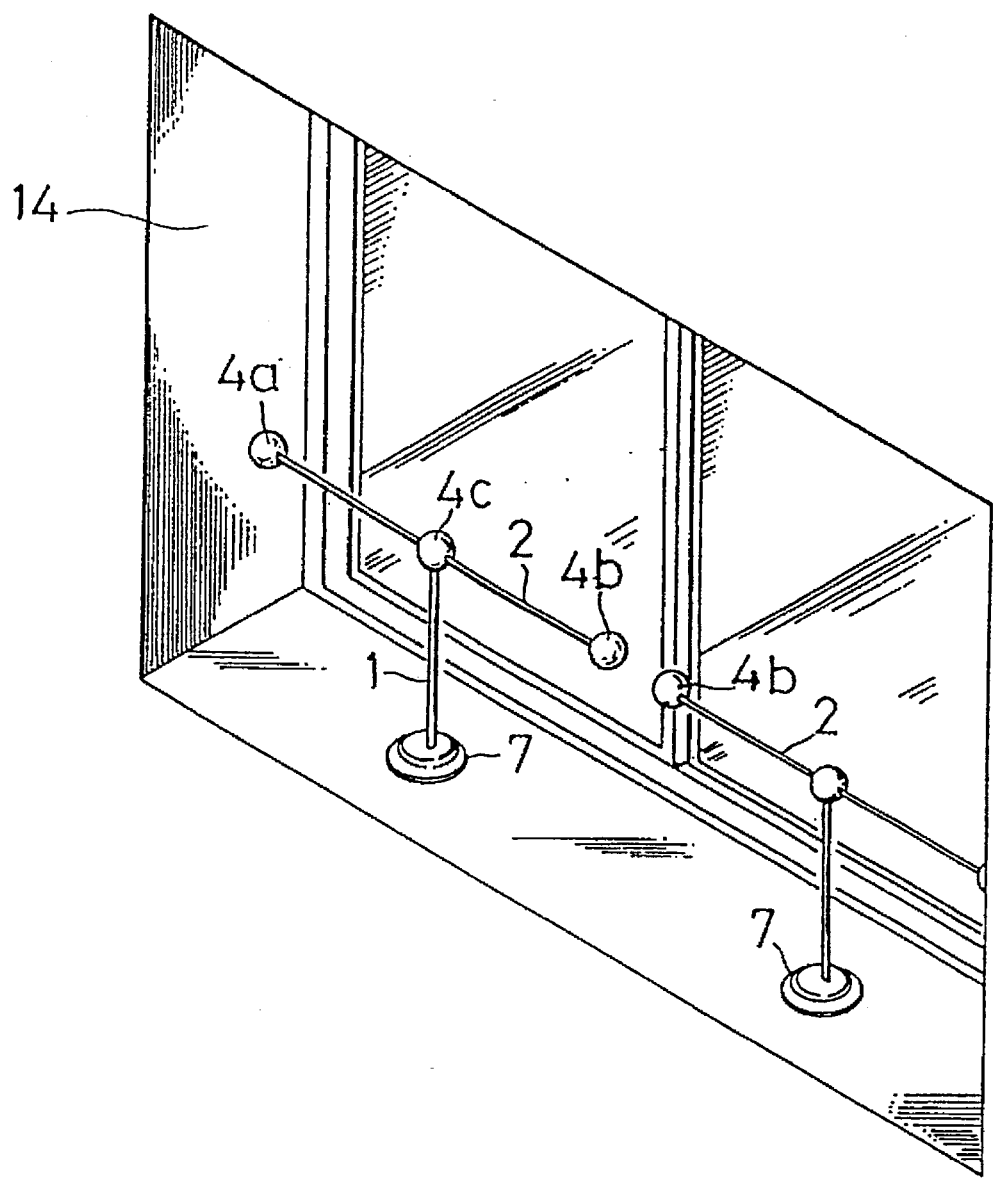
FIG. 10 is a perspective view which illustrates the operative state that two apparatuses each constructed as shown in FIG. 2 is disposed on the bay window of a building.
Figure 11:
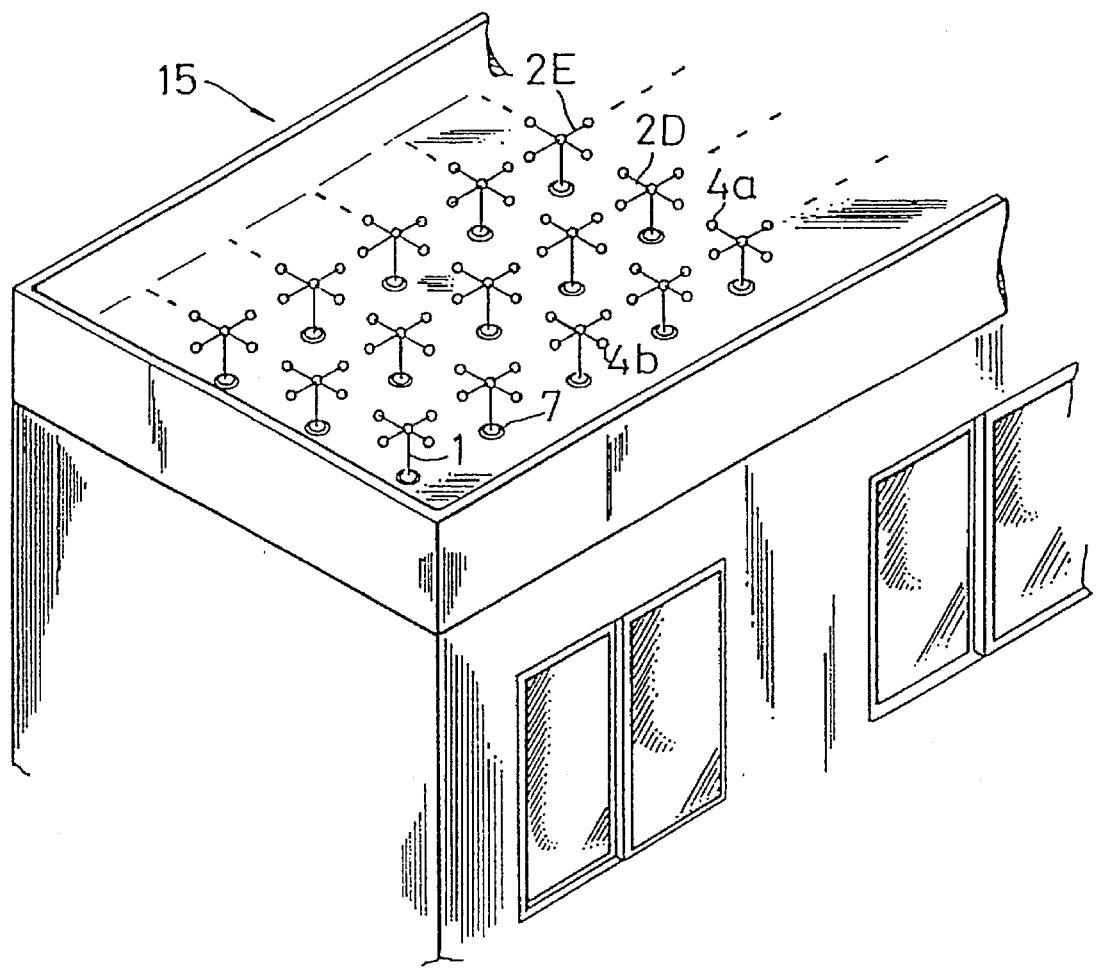
FIG. 11 is a perspective view which illustrates the operative state that a plurality of apparatuses each constructed as shown in FIG. 5 are arranged on the rooftop of a building.

FIG. 10 and FIG. 11 illustrate by way of example the operative state that two apparatuses each constructed in the above-described manner are mounted on the bow window of a building (see FIG. 10) and a number of apparatuses each constructed in that way are mounted on a rooftop 15 of a building (see FIG. 11). In view of the fact that the rooftop 15 of a building is usually contaminated with bird droppings, each apparatus assures that crowding of birds on the rooftop 15 can reliably be prevented. In the shown case, each apparatus mounted on the rooftop 15 is exemplified by the apparatus as shown in FIG. 2 and FIG. 5. However, it of course is obvious that the apparatus as shown in each of FIG. 3, FIG. 4, FIG. 7 and FIG. 9 can likewise be employed for the same purpose.

Figure 12:
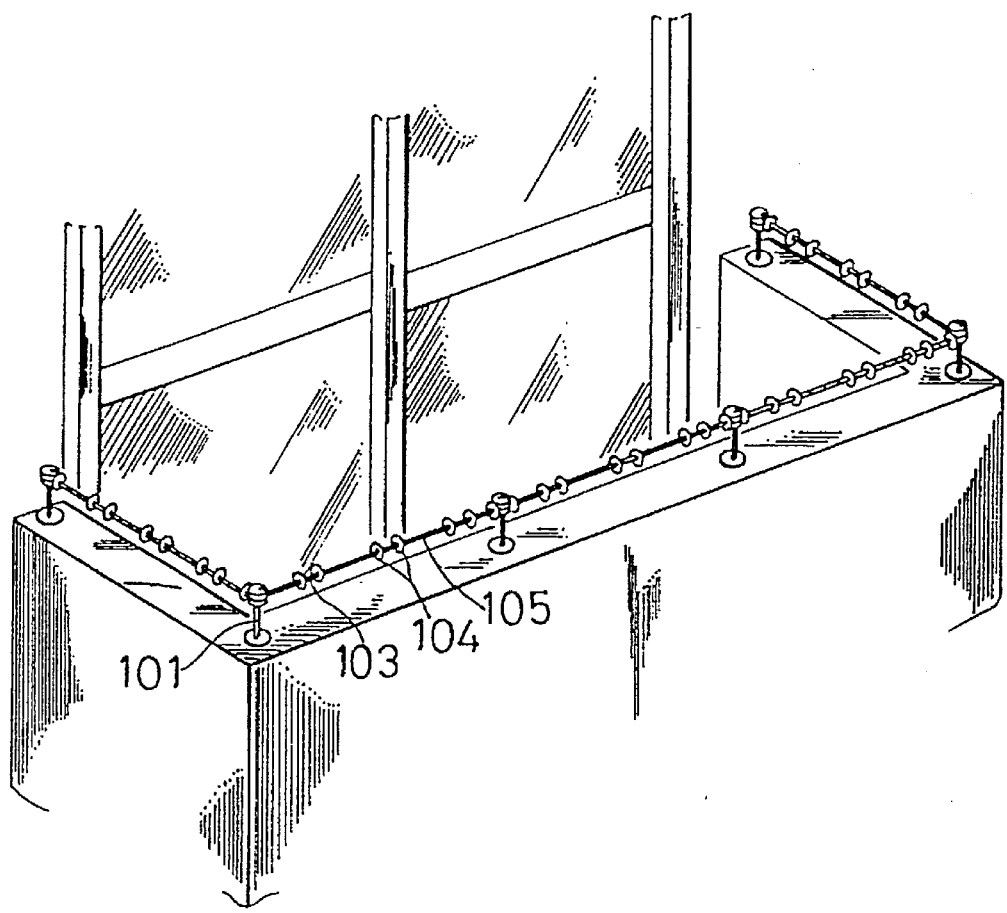
FIG. 12 is a perspective view of an apparatus for inhibitively preventing birds, especially, pigeons from crowding at the upper part of a building wherein the apparatus is constructed in accordance with a seventh embodiment of the present invention.
Figure 13:
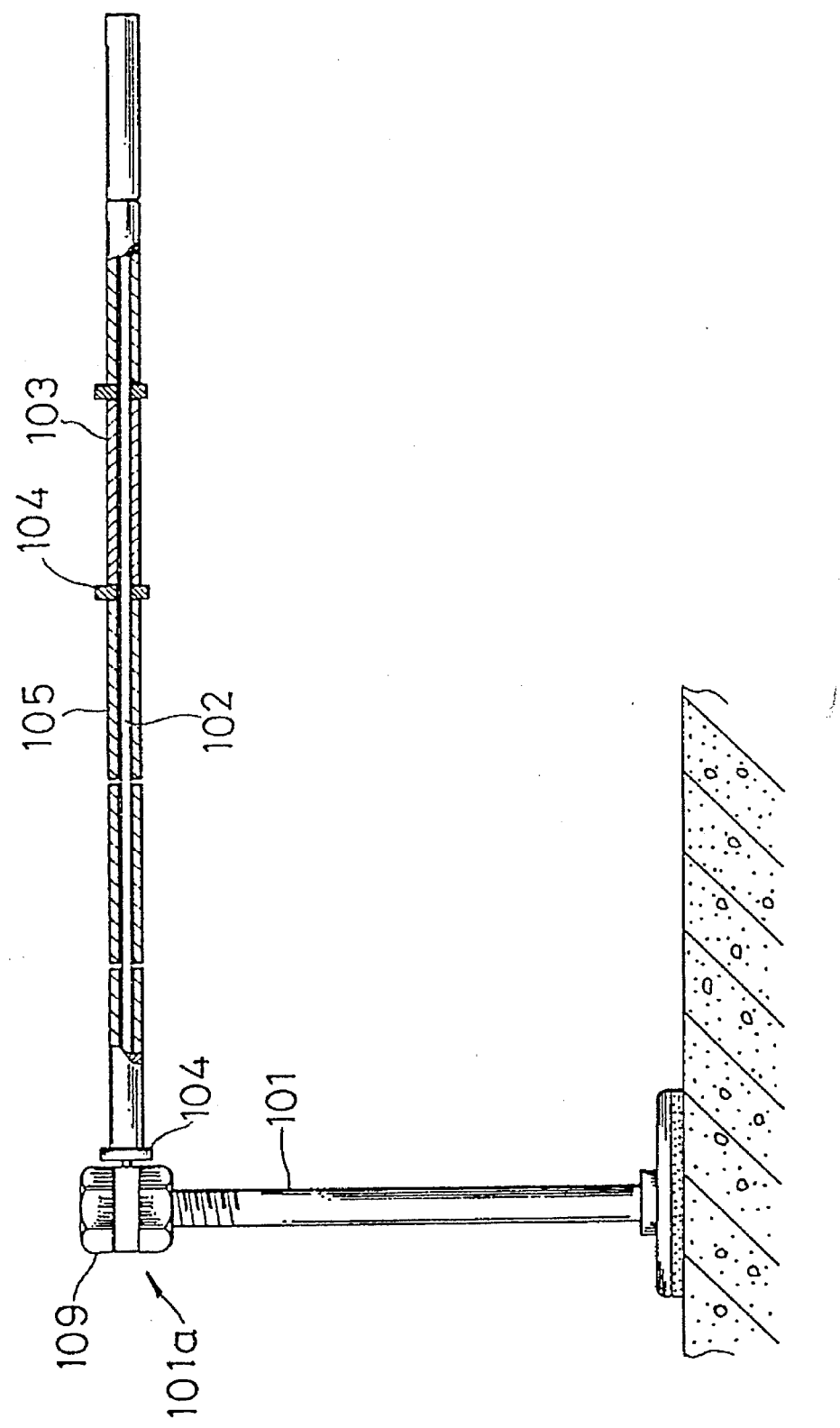
FIG. 13 is a fragmentary enlarged front view of the apparatus shown in FIG. 12 wherein the apparatus is partially exploded.

Next, an apparatus constructed in accordance with a seventh embodiment of the present invention will be described below with reference to FIG. 12 and FIG. 13 wherein FIG. 12 is a perspective view which illustrates that the apparatus is arranged on the veranda of a building and FIG. 13 is a partially exploded front view of the apparatus.

In the drawings, reference numeral 101 designates a support column which is prepared in the form of a bolt, a round rod, a rod-shaped material, a plate-shaped material or the like, reference numeral 102 designates a wire-shaped member which is tightly spanned between adjacent support columns 101, reference numeral 103 designates a cylindrical hollow magnetic member through which the wire-shaped member 102 is inserted in such a manner as to allow the cylindrical magnetic member 103 to be rotated about the wire-shaped member 102, reference numeral 104 designates a washer which serves to determine a position to be assumed on the wire-shaped member 102 by the cylindrical magnetic member 103, and reference numeral 105 designates a sleeve which is rotatably fitted onto the wire-shaped material 102.

Each support column 101 is firmly mounted on a location where it is not acceptable that bird droppings are deposited thereon, e.g., a handrail 106 located on the upper surface of a veranda on a building, a rooftop of a cathedral, a rooftop of a building or the like, by using an adhesive 107 or tightening a plurality of screws or bolts. It is recommendable that a height of the support column 101 is changed depending on the kind of birds. For example, in the case of pigeons, it is preferable that it is set to about 10 cm, and in the case of crows, it is preferable that it is set to about 20 cm.

Since the cylindrical magnetic member 103 and the sleeve 105 are rotatably fitted onto the wire-shaped member 102, when a bird perches on the cylindrical magnetic member 103 while seizing the latter with his feet, the cylindrical magnetic member 103 is rotated by the action of the dead weight of the bird with the result that the bird can not practically perch on the cylindrical magnetic member 103 any longer. It is acceptable that an intensity of magnetic force is determined such that the biological instinctive ability of each bird for sensing the presence of a magnetic field is not adversely affected by the magnetic field. It is found based on the results derived from a variety of experiments that an intensity of magnetic force is preferably set to 1500 gausses or more and a distance between adjacent cylindrical magnetic members 103 is preferably set to about 20 to 30 cm. To assure that each sleeve 105 is easily rotated about the wire-shaped member 102, it is desirable that it is made of a comparatively light raw material, e.g., a wheat straw, a plastic material or the like.

When the apparatus is mounted at the upper part of a building, first, dust particles, oily materials, bird droppings or similar foreign materials deposited on a predetermined mounting position (e.g., located on a handrail 106 on the veranda of a building) are completely removed therefrom by brushing, water washing or the like, and subsequently, a base 108 for the support column 101 is coated with an adhesive 107 so as to allow the support column 101 to be firmly mounted on the veranda. At this time, it is desirable that the base 108 is depressed against the veranda by tightening a plurality of screws or the like. Subsequently, a nut 109 located at the uppermost end of the support column 1 is disengaged from the latter so that a predetermined number of cylindrical hollow magnetic members 103 and a predetermined number of sleeves 105 are alternately fitted onto the wire-shaped member 102. On completion of the fitting operation, the left-hand end of the wire-shaped member 102 is once wound about a bolt head portion 101a, and thereafter, the nut 109 is increasingly engaged with male threads at the upper part of the support column 101 so as to allow the wire-shaped member 102 to be tightly spanned between adjacent support columns 101. An extra length of wire-shaped member 102 is wound about the support column 101 or cut off by actuating a cutting tool.

Once the apparatus is mounted on the building in the above-described manner, since birds dislike the presence of a magnetic field, there does not arise an occasion that they come near to a series of cylindrical hollow magnet members 103. When some bird insensitive to the magnetic field perches on the cylindrical hollow magnetic member 103 or the sleeve 105 between adjacent cylindrical hollow magnetic members 103 while seizing it with his feet, the bird is rotated by the action of his own dead weight because the cylindrical hollow magnetic member 103 and the sleeve 105 are able to rotate about the wire-shaped member 102, resulting in the bird amazingly flying away from the apparatus. Consequently, there does not arise a malfunction that the handrail 106 is contaminated with bird droppings.

Figure 14:
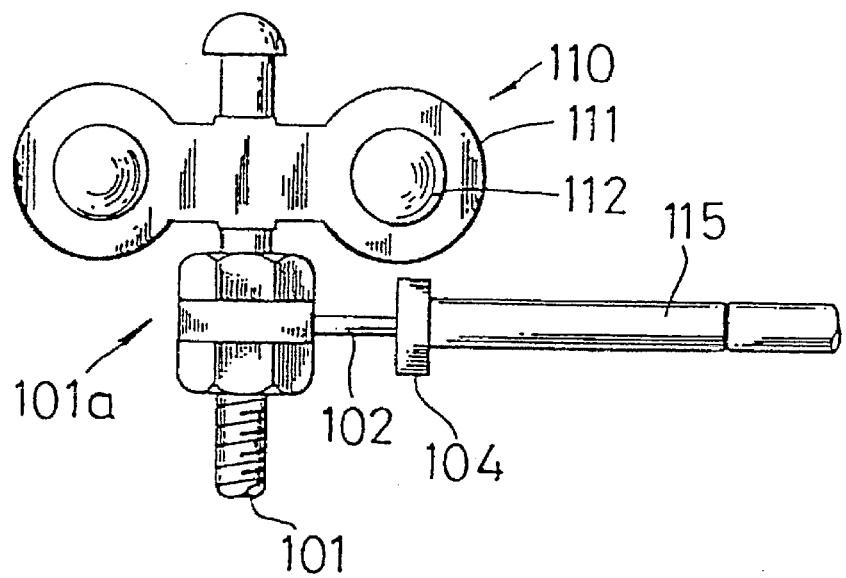
FIG. 14(A) and FIG. 14(B) illustrate an apparatus for inhibitively preventing birds, especially, pigeons from crowding at the upper part of a building, respectively, wherein the apparatus is constructed in accordance with an eighth embodiment of the present invention.
Figure 14:
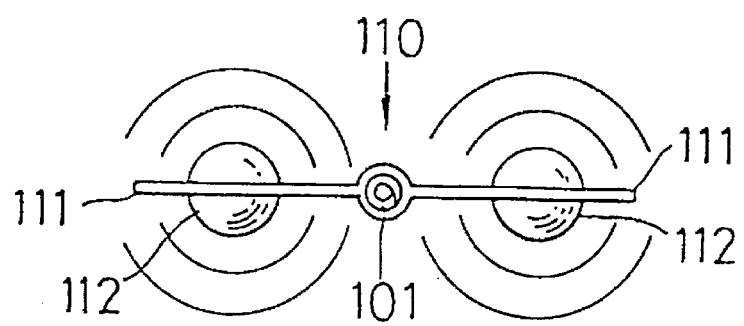

FIG. 14(A) and FIG. 14(B) illustrate an apparatus constructed in accordance with an eighth embodiment of the present invention, respectively. In practice, this embodiment is modified from the preceding embodiment in such a manner that a rotary wind blade 110 is disposed at the uppermost end part of the support column 101 and spherical magnetic members 112 are fitted into the opposite sides of the rotary wind blade 110.

As natural wind or air stream induced by the fluttering of wings of a flying bird collides against a base plate 111 of the rotary wind blade 110, the latter is rotated together with the spherical magnetic members 112, causing the magnetic field induced by the cylindrical hollow magnetic members 103 to be widely affected by the magnetic field induced by the rotating spherical magnetic members 112. It has been confirmed based on the results derived from a variety of experiments that the magnetic field induced by the cylindrical hollow member 103 in the preceding embodiment is largely affected by 10 to 1000 times in the presence of the rotary magnetic field induced by the spherical magnetic members 112 depending on an intensity of wind force (within the range of about 2.0 to 30 m as measured from the apparatus in the case that the cylindrical hollow magnetic members 103 are arranged with a distance of 20 to 30 cm held between adjacent ones). Owing to the arrangement of the rotary wind blade 110 in that way, the number of cylindrical hollow magnetic members 103 can be reduced depending on the surrounding conditions. An advantageous effect of the apparatus is that no cost is required for rotatably driving the rotary wind blade 110 because natural wind stream is utilized for rotating the rotary wind blade 110.

In some case, it is acceptable that the cylindrical hollow magnetic member 103 is brought in contact with the sleeve 105 without any exposure of the wire-shaped member 102 to the outside by squeezing the cylindrical hollow magnetic members 103 and the sleeves 104 toward the central part of the wire-shaped member 102 from the opposite support columns 101 with the aid of elastic or resilient members such as coil springs or the like.

Figure 15:
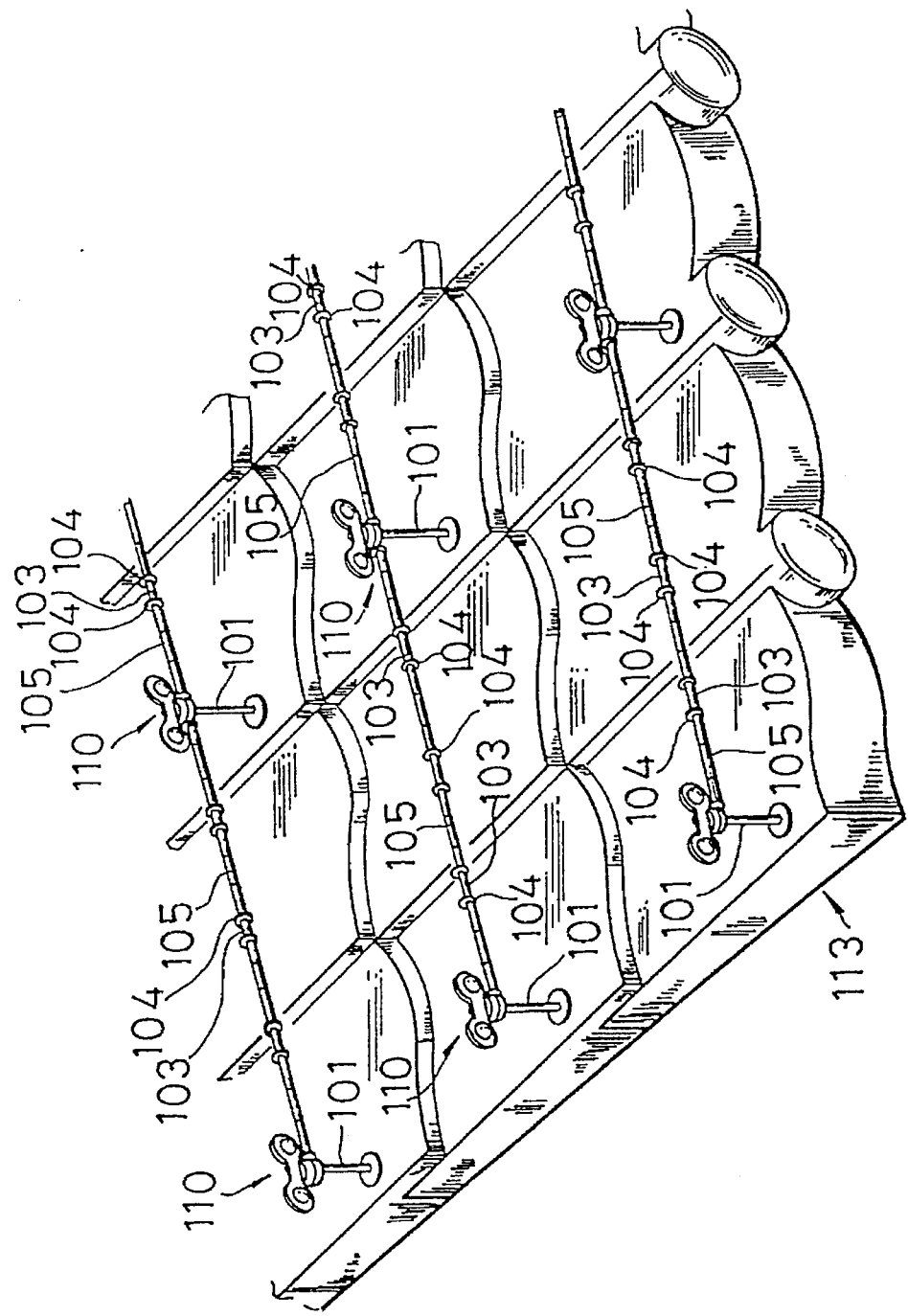
FIG. 15 is a perspective view which illustrates the operative state that a plurality of apparatuses each constructed as shown in FIG. 14(A) and FIG. 14(B) are arranged on the rooftop of a Japanese type living house.

FIG. 15 shows by way of perspective view the operative state that a plurality of apparatuses each constructed as shown in FIG. 14(A) and FIG. 14(B) are arranged on a rooftop 113 of a Japanese living house lined with a number of roofing tiles. In the shown case, three lines of wire-shaped members 102 are arranged within the full width of the rooftop 113 while extending in parallel with each other with a distance of 50 to 100 cm held between adjacent lines of wire-shaped members 102. With this construction, the whole rooftop 113 is covered with the magnetic field, resulting no bird coming near to the rooftop 113. Thus, there is no possibility that the rooftop 113 is contaminated with bird droppings.

Figure 16:
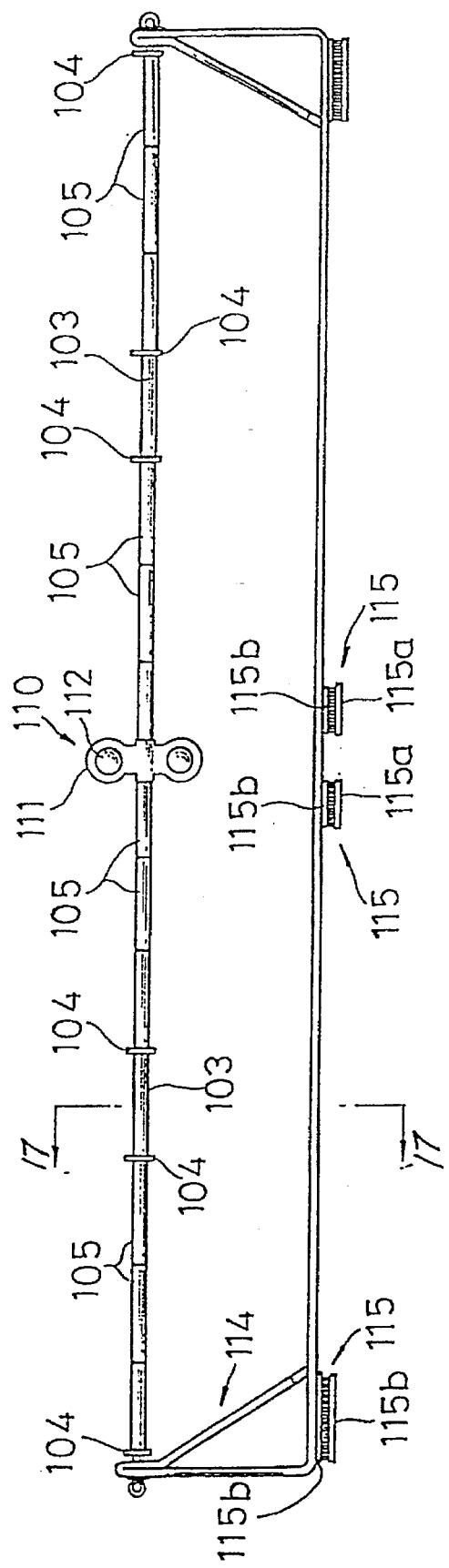
FIG. 16 is a front view of an apparatus for inhibitively preventing birds, especially, pigeons from crowding at the upper part of a building wherein the apparatus is constructed in accordance with a ninth embodiment of the present invention.
Figure 17:
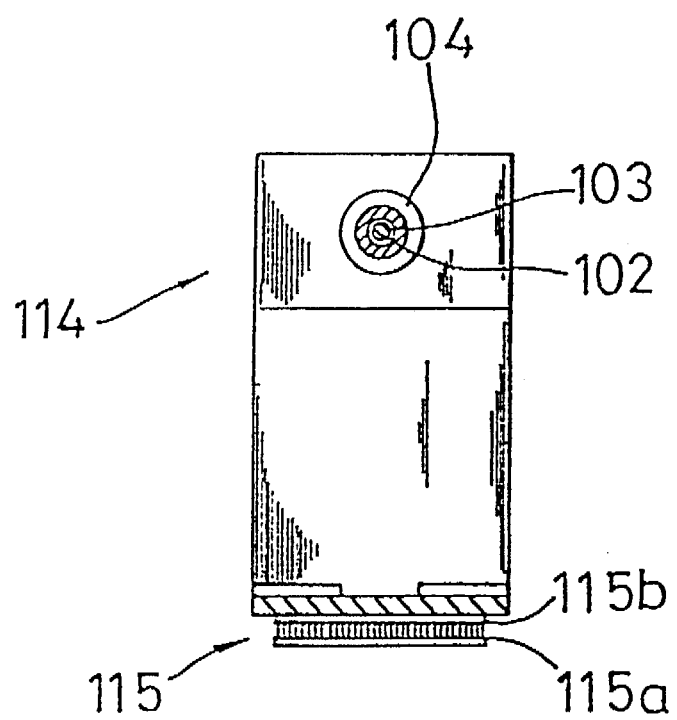
FIG. 17 is a sectional view of the apparatus taken along line 17—17 in FIG. 16.

FIG. 16 and FIG. 17 illustrate an apparatus constructed in accordance with a ninth embodiment of the present invention, respectively. In this embodiment, while a plurality of cylindrical hollow magnetic members 103, a plurality of sleeves 105 and a rotary blade plate 110 are preliminarily fitted onto a wire-shaped member 102 in accordance with the shown order, an assembly of the cylindrical hollow magnetic members 103, the sleeves 105 and the rotary wind blade 110 is tightly spanned between opposite triangular support columns 114 each made of plate-like materials. One half 115a of a conventional attaching/ detaching unit 15 is secured the lower surface of the support column 114 by using an adhesive, while other half 15a of the same is firmly placed on the handrail of a veranda at a predetermined position of the latter by tightening screws. With this construction, the apparatus can easily be disconnected from a handrail of the upper surface of veranda when a set of beddings are placed on the veranda in the suspended state for exposing them to sunshine for the purpose of drying them. Another advantageous effect of the apparatus is that a small number of manhours are required for mounting the apparatus on the veranda because the cylindrical hollow magnetic members 103, the sleeves 105 and the rotary blade plate 110 are preliminarily fitted onto the wire-shaped member 102.

Next, an apparatus constructed in accordance with a tenth embodiment of the present invention will be described below with reference to FIG. 18 and FIG. 19.

Figure 18:
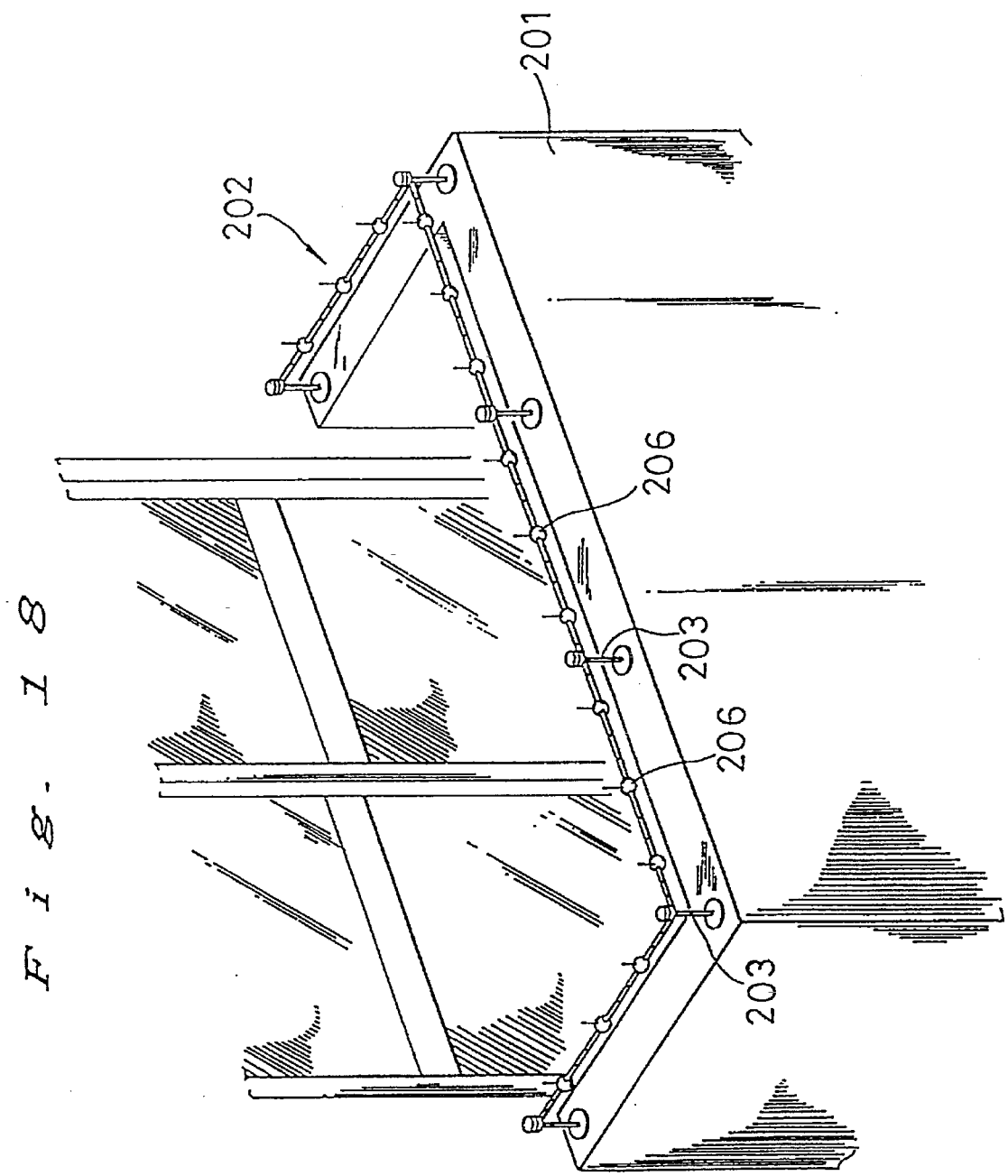
FIG. 18 is a perspective view of an apparatus for inhibitively preventing birds, especially, pigeons from crowding at the upper part of a building wherein the apparatus is constructed in accordance with a tenth embodiment of the present invention, illustrating the operative state that the apparatus is arranged on a veranda of the building.

FIG. 18 shows by way of perspective view the structure of the apparatus generally represented by reference numeral 202. In the shown case, the apparatus 202 is arranged on, e.g., a handrail 201 of a veranda of a living mansion in such a manner that a plurality of bolts 203 each serving as a support column are caused to firmly stand upright on the handrail 201 by using an adhesive or tightening a plurality of screws, a wire-shaped member 205 is tightly spanned between adjacent bolts 203, and a predetermined number of balloon-shaped magnetic members 206 are disposed on the wire-shaped materials 205 in the equally spaced relationship.

A height of each bolt 203 is changed depending on the kind of birds. For example, in the case of pigeons, it is preferable that it is set to about 10 cm, while in the case of crows, it is preferable that it is set to about 20 cm. In the shown case, the apparatus 202 is constructed to exhibit a single stage structure of which height is changed in the above-described manner. Alternatively, the apparatus 202 may be constructed to exhibit a two-staged structure or a three-staged structure.

As is best seen in FIG. 19, a single magnetic needle 207 is caused to stand upright from the balloon-shaped magnetic member 206 for preventing birds from crowding on the apparatus 202. However, the present invention should not be limited only to a single magnetic needle 207. Alternatively, a plurality of magnetic needles 207 may be arranged over the whole spherical surface (preferably, over the upper semispherical surface) of the balloon-shaped magnetic member 206. Otherwise, a plurality of magnetic needles 207 may be arranged along a wire-shaped member 205 similar to a thorny wire having a number of needles projected therefrom.

Reference numeral 208 designates a spacer tube made of a non-metallic material such as a synthetic resin or a similar material. The spacer tube 208 is rotatably fitted onto the wire-shaped material 205. As shown in FIG. 19, each balloon-shaped magnetic member 206 is interposed between adjacent spacer tubes 208. When a bird perches on the spacer tube 208 while seizing the latter with his feet, the spacer tube 208 is rotated about the wire-shaped member 205 by the action of his own dead weight, resulting in the bird becoming unable to perch on the spacer tube 208 any longer.

When the apparatus 202 is mounted at the upper part of a building at a predetermined position (e.g., on a handrail 201 of a veranda), first, dust particles, oily materials, bird droppings or similar foreign materials on the handrail 201 are completely removed from the latter by brushing, water washing or the like, and a base 209 for each bolt 203 is coated with an adhesive 204 so as to allow the bolt 203 to be firmly mounted on the handrail 201. Otherwise, the base 209 may be depressed against the handrail 201 by tightening a plurality of screws or the like. Subsequently, a nut 210 is disengaged from a male-threaded part of the bolt 203, a plurality of balloon-shaped magnetic members 206 are fitted onto the wire-shaped material 205 in the equally spaced relationship with a predetermined distance held between adjacent ones, and one end part of the wire-shaped material 205 is wound around the upper end part of the bolt 203. Thereafter, the nut 210 is threadably engaged with the male-threaded part of the bolt 203 so that the wire-shaped material 205 is tightly spanned between adjacent bolts 203. At this time, an extra length of wire-shaped member 205 is wound around the bolt 203 located at the extreme end of the wire-shaped material 205 or it is cut off by actuating a cutting tool. The distance between adjacent balloon-shaped magnetic members 206 is changed depending on an intensity of magnetic force induced by each balloon-shaped magnetic member 206. It has been found based on the data derived from a variety of experiments that acceptable results are obtained when each balloon-shaped magnetic member 206 generates a magnetic force having an intensity of 3000 gausses or more while the distance between adjacent balloon-shaped magnetic members 206 is set to 20 to 30 cm.

FIG. 20(A) and FIG. 20(B) illustrate an apparatus constructed in accordance with an eleventh embodiment of the present invention, respectively. In this embodiment, a rotary wind blade 211 is fitted onto a tune 208 made of a non-metallic material such as a synthetic resin or the like, and two spherical magnetic members 206 are fitted to a blade plate 212 of the rotary wind blade 211 on the opposite side of the latter.

As natural wind or wind stream induced by the flattering of wings of a bird collides against the blade plate 212 of the rotary wind blade 211, the latter is rotated about the wire-shaped material 205, causing the magnetic field induced by the balloon-shaped magnetic member 203 and the magnetic needles 207 to be widely affected by the magnetic field induced by the spherical magnetic members 207 of the rotary wind blades 211. It has been confirmed based on the results derived from a variety of experiments that the magnetic field induced in the preceding embodiment is largely affected by 10 to 1000 times in the presence of the rotary magnetic field induced by the spherical magnetic members 206 depending on an intensity of wind force (within the range of 2.5 to 25 m as measured from the apparatus in the case that the rotary wind blades 211 are arranged in the equally spaced relationship with a distance of 20 to 30 cm held between adjacent ones). Owing to the arrangement of the rotary wind blades 211 in that way, the number of balloon-shaped magnetic members constructed in the above-described manner in the preceding embodiment can be reduced. Another advantageous effect of the apparatus is that no cost is required for rotatably driving the rotary wind blade 211 because natural wind stream is utilized for rotating the rotary wind blade 211.

FIG. 21 shows by way of a perspective view the operative state that a plurality of apparatuses each constructed as shown in FIG. 18 and FIG. 19 are arranged in the form of three lines on a rooftop 213 of a Japanese living house lined with a number of roofing tiles. In the shown case, three wire-shaped members 205 are arranged within the full width of the rooftop 213 while extending in parallel with each other with a distance of 50 to 100 cm held between adjacent lines of apparatuses 202. With this construction, the whole rooftop 213 is covered with the magnetic field, resulting in no bird coming near to the rooftop 213. Thus, there is no possibility that the rooftop 213 is contaminated with bird droppings. In the shown case, it of course is obvious that the number of balloon-shaped magnetic members 206 can be reduced by arranging the rotary wind blades 212 in that way.

Figure 22:
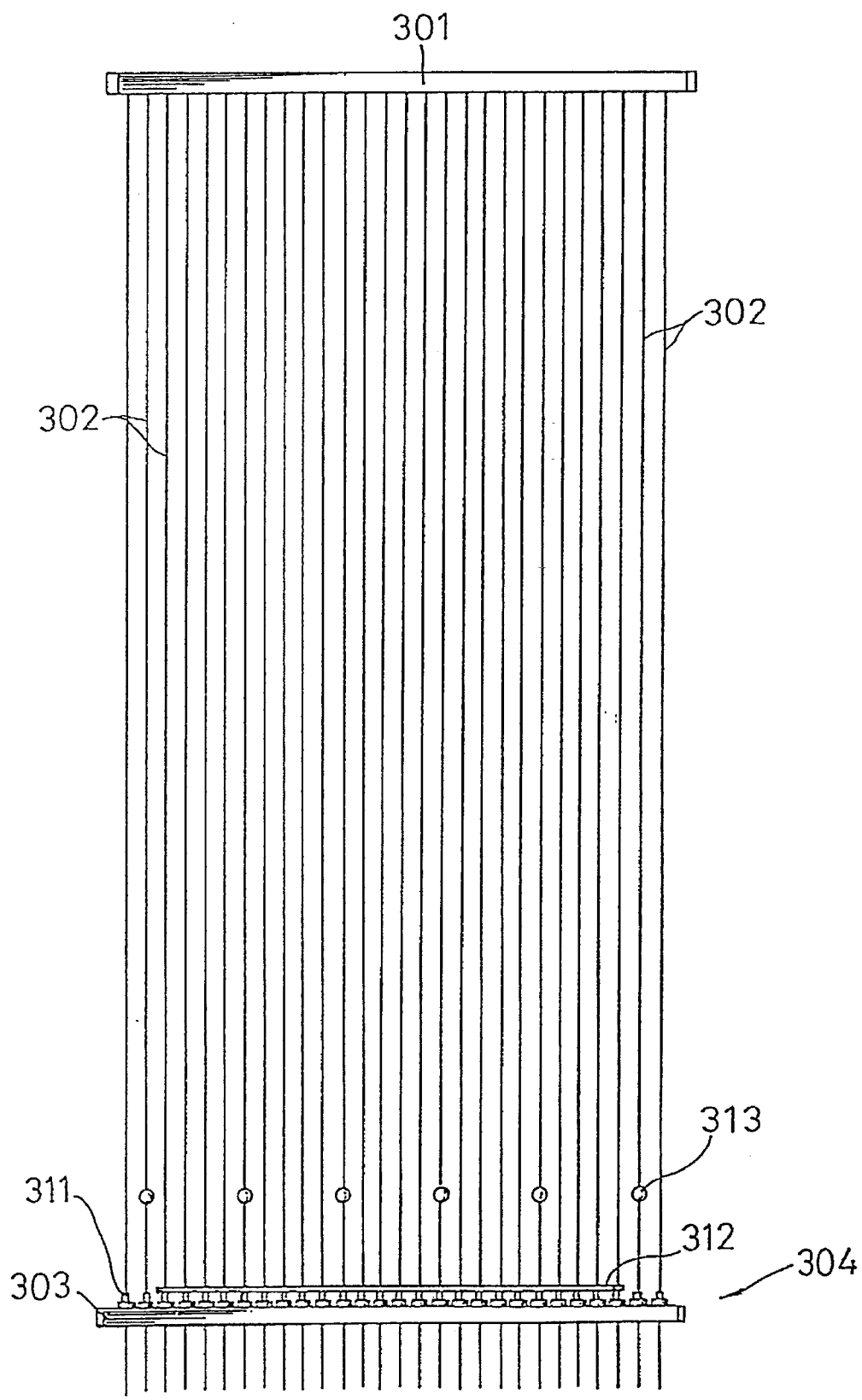
FIG. 22 is a front view of an apparatus for inhibitively preventing birds, especially, pigeons from crowding at the upper part of a building wherein the apparatus is constructed in accordance with a twelfth embodiment of the present invention.
Figure 23:
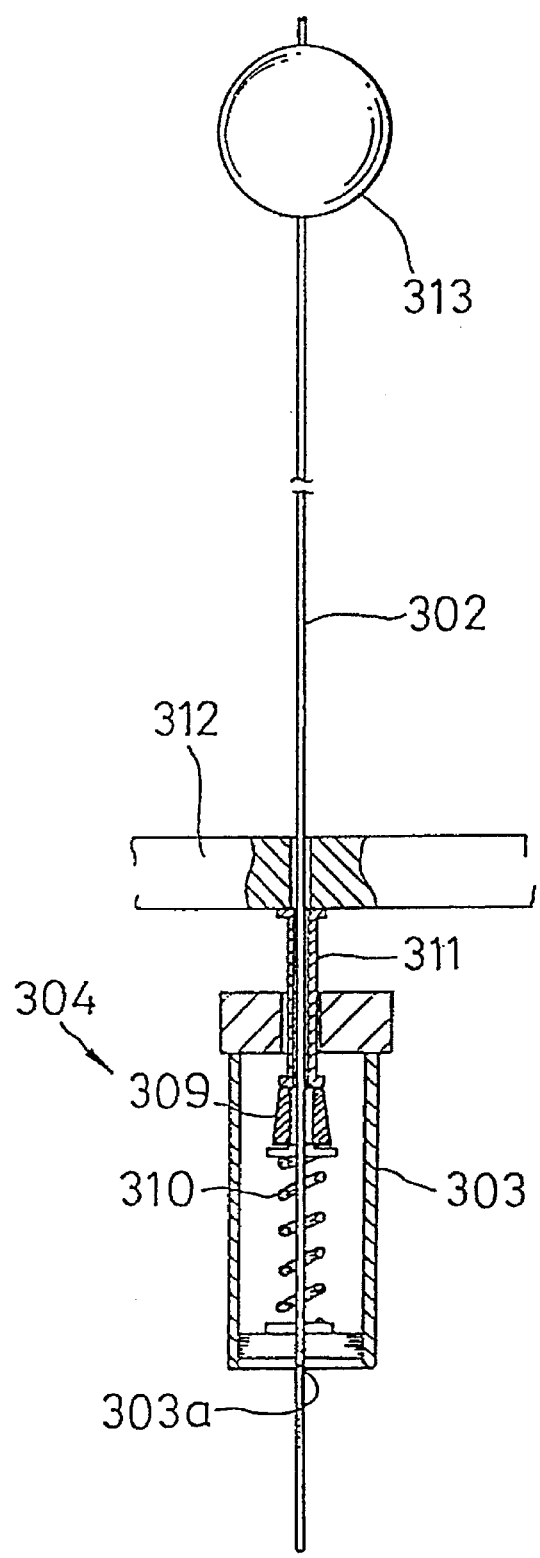
FIG. 23 is a fragmentary enlarged sectional view of the apparatus shown in FIG. 22, illustrating essential components constituting the apparatus.

Next, an apparatus constructed in accordance with a twelfth embodiment of the present invention will be described below with reference to FIG. 22 to FIG. 24.

In the drawings, reference numeral 301 designates a first base member, reference numeral 302 designates a plurality of wires which are suspended from the first base member 301 in the equally spaced relationship as seen in the horizontal direction, reference numeral 303 designates a second base member which is secured to the lower end part of each wire 302, and reference numeral 304 designates a wire connecting/disconnecting mechanism for attaching some of the wires 302 or all of the latter to the second base member 303 and detaching the former from the latter.

The longitudinally extending first base member 301 is secured to a ceiling 307 of a building 305 at the rear end of an opening portion 306 of the building 305 located above a veranda (see FIG. 24) by tightening a plurality of screws, and a number of wires 302 each of which one end is fixed to the first base member 301 are suspended from the latter in the equally spaced relationship as seen in the horizontal direction while extending in parallel with each other, in order to prevent birds from entering the opening portion 306 of the building 305 through plural lines of wires 302. The distance between adjacent wires 302 is changed depending on the kind of birds, and in the case of pigeons, it is preferable that the distance is set to about 5 to 10 cm. As shown in FIG. 24, the length of each wire 302 is dimensioned to be equal to a distance between the ceiling 307 and the upper surface of a handrail 308.

The second base member 303 is located on the rear end side of the wires 302, and a plurality of holes are formed through the second base member 303 so as to allow the wires 302 to extend through the second base member 303. It should be noted that the second base member 303 serves also as a weight for preventing the wires 302 from being flapped away from the vertical plane by the action of the air stream which has collided against the wires 302.

The wire connecting/disconnecting mechanism 304 may be constructed in any suitably acceptable manner. In the shown case, the wire connecting/disconnecting mechanism 304 is constructed such that a chuck 309 is disposed in the second base member 303 so as to allow a wire 302 to be inserted therethrough, a coil spring 310 adapted to biasing the chuck 309 in the upward direction to hold the chuck 309 from below is disposed below the chuck 309, and a depressing pin 311 is inserted through the hole of the second base member 303 for splitting the chuck 309 into two halves to release the wire 302 from the connected state. When the depressing pin 311 is depressed against the resilient force of the coil spring 310, the chuck 309 is openably split to two halves to assume a loosened state, enabling the wire 302 to be slidably displaced in the upward/downward direction. On the contrary, when the depressing pin 311 is released from the depressed state, the chuck 309 assumes a closed state by the resilient force of the coil spring 310, causing the wire 302 to be immovably seized by the chuck 309.

When each wire 302 is disconnected from the second base member 303, it is sufficient that the depressing pin 311 corresponding to the foregoing wire 302 is depressed with a user's hand. However, in the case of an occurrence of emergency such as firing or the like, since a manual depressing operation as mentioned above takes an excessively long time, it is desirable that a depressing plate 312 is arranged above the second base member 303 so as to simultaneously depress all the depressing pins 311 with a user's hand or foot to disconnect all the wires 302 from the second base plate 303. In this case, when it is found that the depressing of the depressing plate 311 in that way may cause the second base member 303 to dangerously fall down, it is recommendable that the length of the depressing plate 312 is adequately adjusted such that the depressing plate 312 does not come in contact with some depressing pins 311 located at the opposite ends of the second base member 302 as shown in FIG. 22.

In the drawings, reference numeral 313 designates a spherical magnetic member. In general, since a bird, especially, a pigeon has a biological instinctive ability of sensing a magnetic field (which serves to determine his flying direction or find a route for returning to his home position by himself), a plurality of spherical magnetic members 313 are arranged on the wires 302 in the equally spaced relationship as seen in the horizontal direction. In the shown case, four wires 302 located between adjacent spherical magnetic members 313 have no spherical magnetic member disposed thereon, respectively. Alternatively, spherical magnetic members 313 may be disposed on all the wires 302. In this case, it is desirable that a height of disposing a spherical magnetic member on the corresponding wire is changed from wire to wire in order to prevent adjacent spherical magnetic members from being magnetically attracted to each other.

Figure 24:
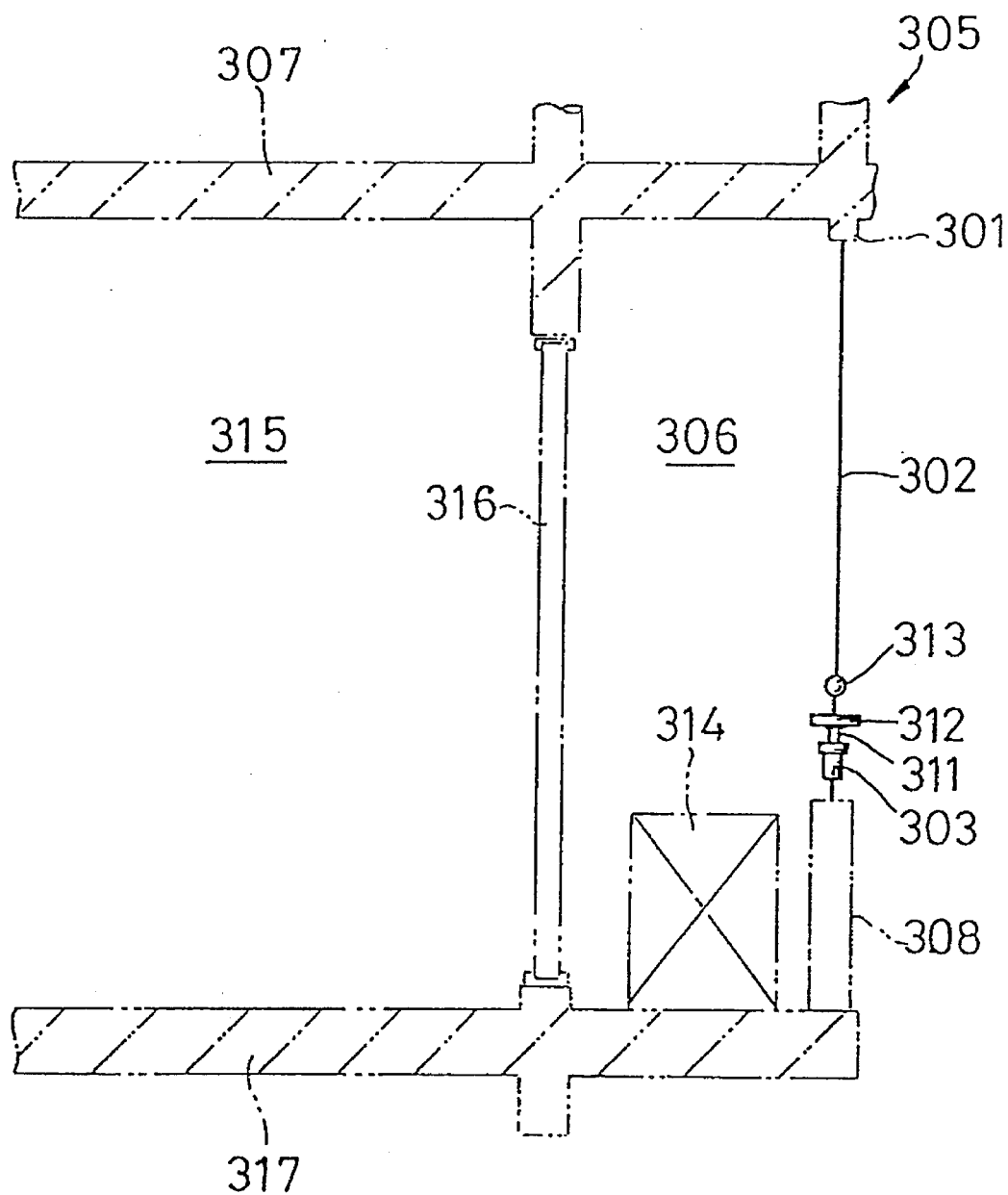
FIG. 24 is a schematic front view of the apparatus represented by solid lines, illustrating the operative state that the apparatus is arranged on the veranda of the building represented by phantom lines.
Figure 25:
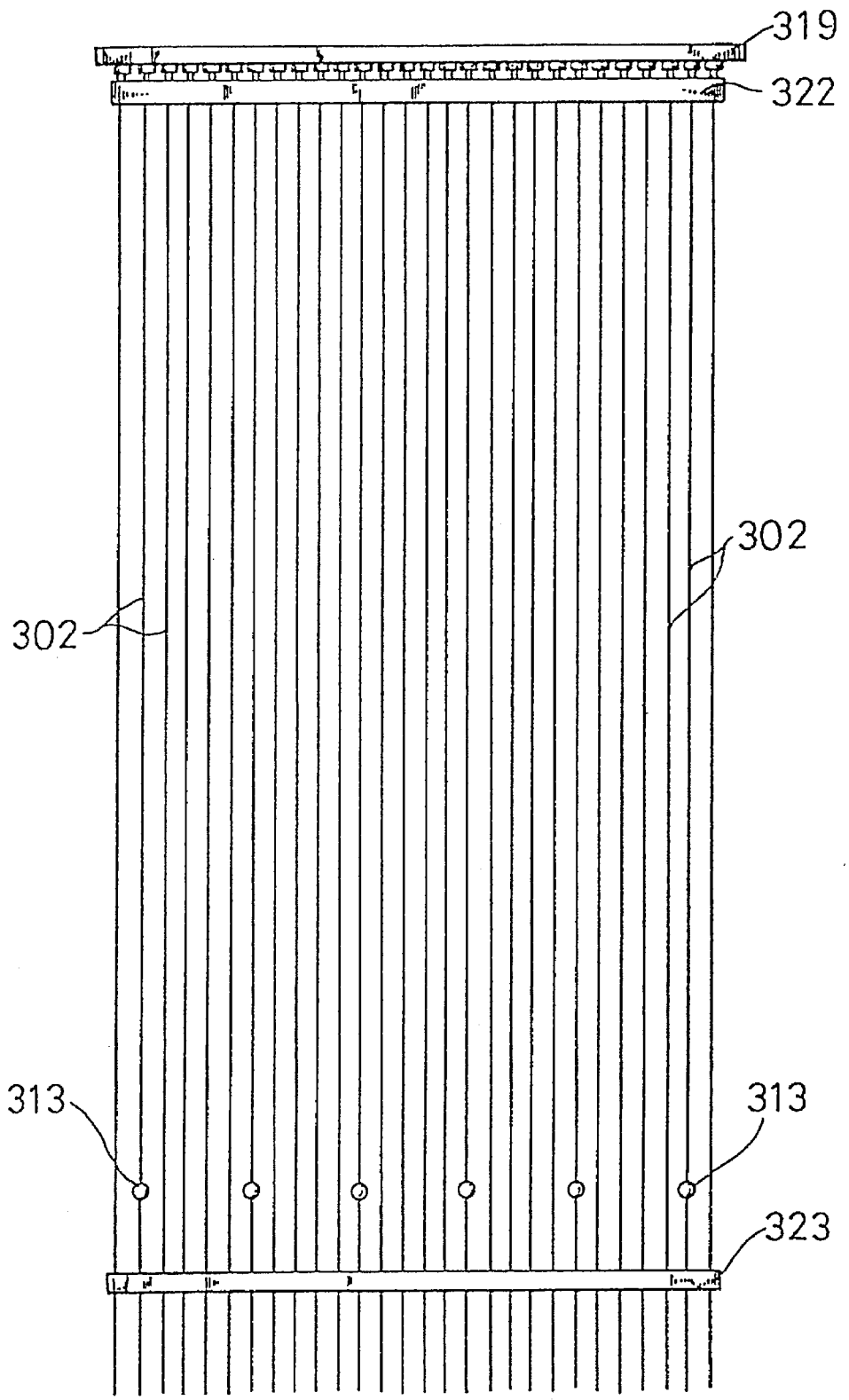
FIG. 25 is a front view of an apparatus for inhibitively preventing birds, especially, pigeons from crowding at the upper part of a building wherein the apparatus is constructed in accordance with a thirteenth embodiment of the present invention.
Figure 26:
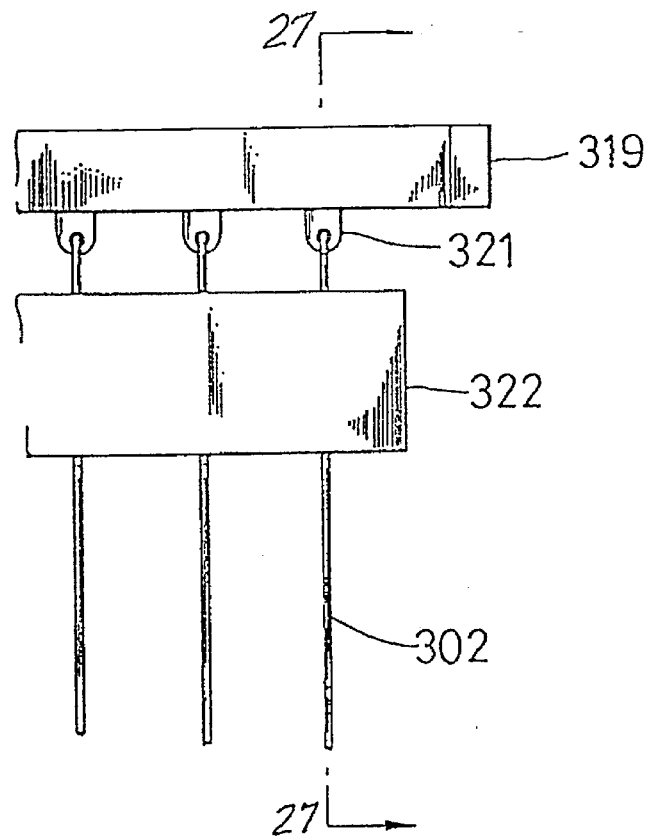
FIG. 26 is a fragmentary enlarged front view of the apparatus, illustrating a curtain mechanism employed for the apparatus shown in FIG. 25.
Figure 27:
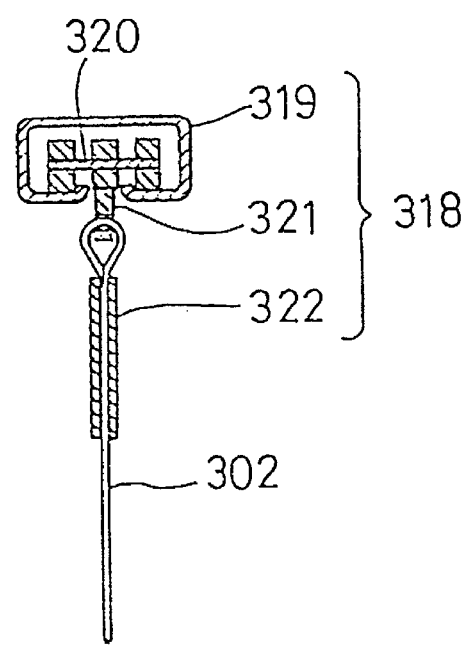
FIG. 27 is a fragmentary enlarged sectional view of the apparatus taken along line 27—27 in FIG. 26.

As shown in FIG. 24, an outdoor unit 314 for an air conditioner is often placed on the veranda of a building. In this case, there is a tendency that birds are liable to crowd on the veranda for looking for the heat generated by the outdoor unit 314. In some case, a bird's nest is built on the veranda. This leads to the result that the veranda is contaminated with bird droppings, causing the veranda to become unsanitary. However, since the opening portion 306 of the building located above the veranda is completely closed with the apparatus constructed in the above-described manner, there does not arise a malfunction that birds enter the veranda and crowd on the latter. It should be emphasized that the wires 302 are caused to extend in the vertical direction but not extend in the horizontal direction. Consequently, any bird can not perch on a wire while seizing it with his feet. In addition, at the time of an occurrence of emergency such as firing or the like, all the wires 302 can easily be disconnected from the first base member 303. With this construction, it is easy that persons staying in a room escape outside of the room or firemen enter the room for performing a fire fighting operation.

Owing to the arrangement of the spherical magnetic members 313 in that way, the apparatus can reliably prevent not only invasion of birds inside of the veranda but also approaching of them to the veranda without any possibility of injuring the birds.

In FIG. 24, reference numeral 315 designates the interior of a room, reference numeral 316 designates an entrance located between the room 315 and the veranda, and reference numeral 317 designate a floor of the building.

Next, an apparatus constructed in accordance with a thirteenth embodiment of the present invention will be described below with reference to FIG. 25 to 28. In this embodiment, same parts or components as those in the preceding embodiment are represented by same reference numerals. Thus, repeated description on them will not be required.

In this embodiment, a curtain mechanism 318 is substituted for the wire connecting/disconnecting mechanism 304 in the preceding embodiment. Specifically, a plurality of hooks 321 are disposed in a casing 319 to slidably move along a rail 20 received in the casing 319, and a wire 302 is suspended from each of the hooks 321. To assure that the respective wires 302 are spaced away from each other as seen in the horizontal direction with a certain distance held between adjacent wires 302 while they are kept in the opened state, the upper end of each wire 302 is folded to assume a substantially inverted U-shaped contour and the jointed part of the wire 302 is supported by a flexible support member 322. It should be noted that the structure of the curtain mechanism 318 (composed of the casing 319, the rail 320 and the hooks 321) is substantially same to that of a curtain mechanism employed for a usual personal room.

Similar to the apparatus in the preceding embodiment, a base member 323 serving also as a weight and a plurality of spherical magnetic members 313 are arranged at the lower parts of the wires 302 in order to prevent the wires 302 from being fluttered.

Figure 28:
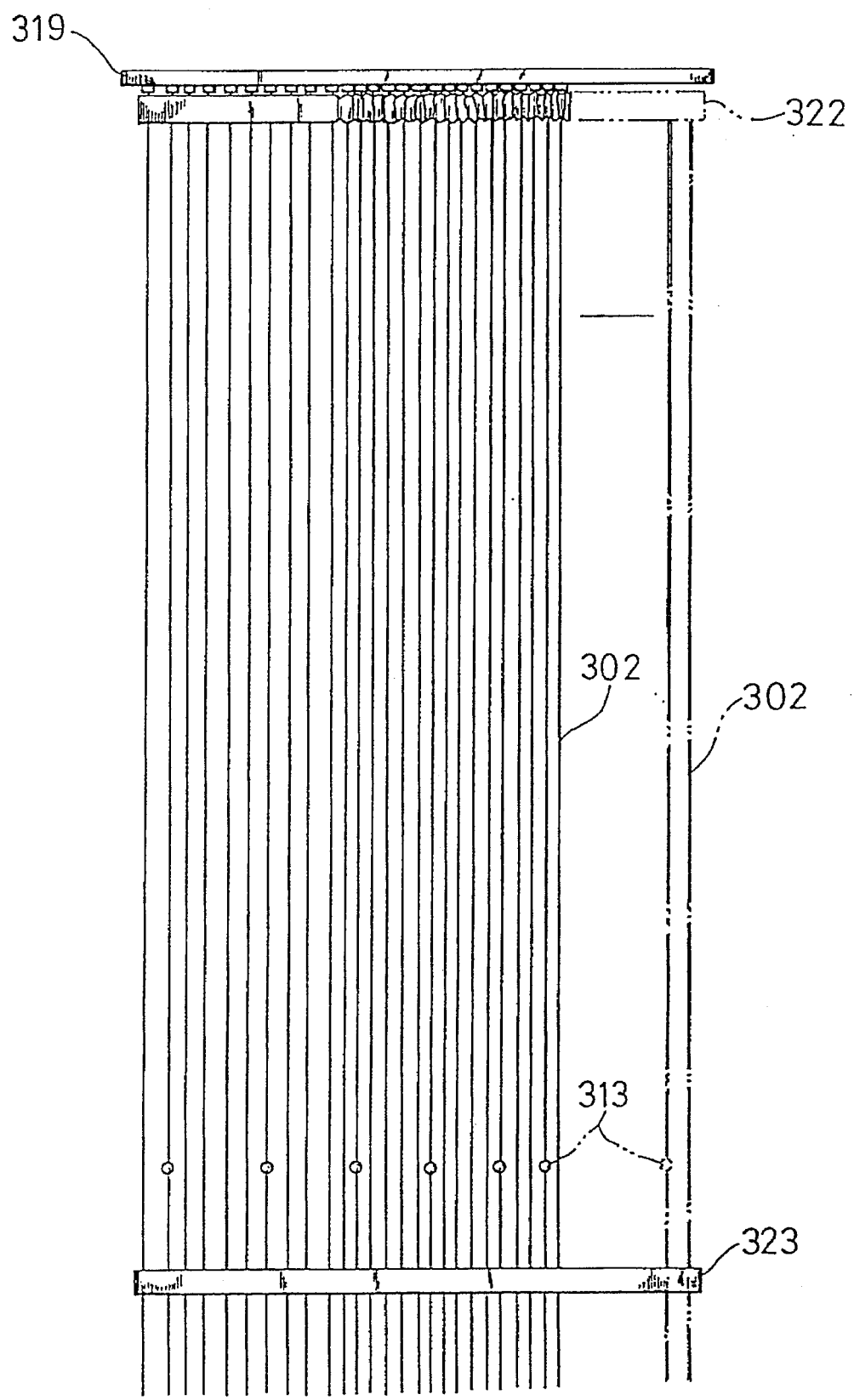
FIG. 28 is a front view of the apparatus, illustrating the operative state that some of wires are displaced from their original positions in the leftward direction with a reduced distance held between adjacent wires.

With such construction, since an opening portion 306 located above the veranda of a building is completely closed with a plurality of wires 302 arranged in the equally spaced relationship as seen in the horizontal direction, the apparatus can reliably prevent birds from invading inside of the veranda and crowding on the latter. In addition, at the time of an occurrence of emergency such as firing or the like, the apparatus makes it possible that persons staying in a room easily escape outside of the room or firemen easily enter the room by slidably displacing the wires 302 in the leftward direction or in the rightward direction as shown in FIG. 28 in order to form a wide open space for the persons living in the room and the firemen.

Owing to the arrangement of the spherical magnetic members in that way, the apparatus can reliably prevent not only the invasion of birds inside of the veranda but also the approaching of the birds to the veranda in the same manner as the preceding embodiment.

While the present invention has been described above with respect to preferred embodiments thereof, it should of course be understood that the present invention should not be limited only to these embodiments but various change or modification may be made without any departure from the scope of the present invention as defined by the appended claims.

What is claimed is:

1. An apparatus for inhibitively preventing birds from crowding at the uppermost part of a building, comprising:
   a plurality of support columns adapted to be located standing upright from the upper part of said building,
   at least one arm turnably disposed on its midpoint at an uppermost end of each said support column, said arm normally at a right angle relative to said support column and adapted to move with respect thereto in one of an upward/downward direction and a leftward/rightward directions, and
   two magnetic members disposed one at each of opposite ends of said arm, and said magnetic member on each said end of said arm positioned such that the movement of said magnetic member will cause movement of a similar magnetic member disposed on the end of the arm of an adjacent support column by magnetic effect.

2. The apparatus as claimed in claim 1, wherein two arms are arranged one above another to build a two-staged structure.

3. The apparatus as claimed in claim 1, wherein a plurality of arms are arranged on the support column in equally spaced relationship as seen in the circumferential direction while defining a certain angle between adjacent arms, and a magnetic member is disposed at the opposite ends of each of said arms.

4. The apparatus as claimed in claim 1, wherein one of said support column and said arm is prepared in the form of a coil spring.

5. The apparatus as claimed in claim 1, wherein each arm is made of a metallic material.

6. The apparatus as claimed in claim 1, wherein each arm is made of a non-metallic material such as wood, synthetic resin, rubber, or fibrous glass.

* * * * *

UNITED STATES PATENT AND TRADEMARK OFFICE
CERTIFICATE OF CORRECTION

PATENT NO. : 5,649,394
DATED : July 22, 1997
INVENTOR(S) : Tadao Ohba

It is certified that error appears in the above-indentified patent and that said Letters Patent is hereby corrected as shown below:

CLAIM 1, Col. 16, Line 50, delete "standing";
    CLAIM 1, Col. 16, Line 56, change "directions" to --direction--.

Signed and Sealed this

Twenty-third Day of September, 1997

Attest:

BRUCE LEHMAN

*Attesting Officer*    *Commissioner of Patents and Trademarks*